(12) United States Patent
Fujiwara et al.

(10) Patent No.: US 10,934,962 B2
(45) Date of Patent: Mar. 2, 2021

(54) ABNORMALITY DIAGNOSIS DEVICE FOR IN-CYLINDER PRESSURE SENSOR

(71) Applicant: Mazda Motor Corporation, Hiroshima (JP)

(72) Inventors: Shoji Fujiwara, Hiroshima (JP); Hidetoshi Hashimoto, Aki-gun (JP); Takuji Okumura, Kure (JP); Shigeru Nakagawa, Hiroshima (JP); Yasushi Torii, Hiroshima (JP); Masayuki Kinoshita, Hiroshima (JP); Yuichiro Tsumura, Aki-gun (JP); Daisuke Tanaka, Hiroshima (JP); Taiki Maiguma, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/663,750

(22) Filed: Oct. 25, 2019

(65) Prior Publication Data
US 2020/0200112 A1    Jun. 25, 2020

(30) Foreign Application Priority Data
Dec. 21, 2018  (JP) .............................. JP2018-239803

(51) Int. Cl.
*F02D 41/00* (2006.01)
*F02D 41/22* (2006.01)
(Continued)

(52) U.S. Cl.
CPC ............ *F02D 41/222* (2013.01); *F02B 77/04* (2013.01); *F02D 35/024* (2013.01);
(Continued)

(58) Field of Classification Search
CPC .............. F02D 41/222; F02D 41/0205; F02D 41/1479; F02D 41/006; F02D 41/0077;
(Continued)

(56) References Cited

U.S. PATENT DOCUMENTS 4,903,664 A * 2/1990 Shinshi ................. F02P 5/1526
123/406.17
5,168,854 A * 12/1992 Hashimoto ........... G01M 15/08
123/406.17
(Continued)

FOREIGN PATENT DOCUMENTS

JP    2010144670 A    7/2010
WO   2013132613 A1   9/2013

*Primary Examiner* — Phutthiwat Wongwian
*Assistant Examiner* — Sherman D Manley
(74) *Attorney, Agent, or Firm* — Alleman Hall Creasman & Tuttle LLP

(57) ABSTRACT

An abnormality diagnosis device of an in-cylinder pressure sensor is provided. The device carries out a performance determination in which a performance quality of the sensor is determined based on an electric signal inputted from the sensor. The device carries out a first determination in which the performance determination is performed at a given timing, a performance recovery in which a given deposit removal control is executed in which a deposit accumulating inside the combustion chamber is removed when the performance quality of the in-cylinder pressure sensor is determined to fall below a given reference value, and a second
(Continued)

determination in which the performance determination is carried out again after the performance recovery. In the second determination, the in-cylinder pressure sensor is diagnosed as abnormal when the performance quality of the sensor is determined to fall below the given reference value.

11 Claims, 12 Drawing Sheets

(51) Int. Cl.

| | | |
|---|---|---|
| *F02B 77/04* | (2006.01) | |
| *F02D 35/02* | (2006.01) | |
| *F02D 41/02* | (2006.01) | |
| *F02D 41/14* | (2006.01) | |
| *F02P 5/153* | (2006.01) | |

(52) U.S. Cl.
CPC ..... *F02D 41/0205* (2013.01); *F02D 41/1479* (2013.01); *F02P 5/153* (2013.01)

(58) Field of Classification Search
CPC .... F02D 41/123; F02D 35/024; F02D 35/023; F02D 13/0261; F02B 77/04; F02B 77/085; F02B 77/083; F02P 5/153; Y02T 10/40

See application file for complete search history.

(56) References Cited

U.S. PATENT DOCUMENTS

| | | | | |
|---|---|---|---|---|
| 5,469,735 | A * | 11/1995 | Watanabe | F02D 35/023 |
| | | | | 73/1.59 |
| 8,516,895 | B2 * | 8/2013 | Verner | F02D 41/222 |
| | | | | 73/744 |
| 9,435,707 | B2 * | 9/2016 | Sasaki | F02D 41/222 |
| 10,481,033 | B2 * | 11/2019 | Joshi | G01L 23/24 |
| 2007/0277591 | A1 * | 12/2007 | Hoshi | F02D 41/222 |
| | | | | 73/35.05 |
| 2013/0073189 | A1 * | 3/2013 | Korenaga | G01L 23/221 |
| | | | | 701/111 |
| 2015/0034047 | A1 | 2/2015 | Yaguchi et al. | |
| 2016/0160776 | A1 * | 6/2016 | Yeager | F02D 35/023 |
| | | | | 123/435 |
| 2016/0160779 | A1 * | 6/2016 | Yeager | F02D 35/023 |
| | | | | 701/103 |
| 2016/0169140 | A1 * | 6/2016 | Yeager | F02D 35/023 |
| | | | | 701/103 |
| 2016/0245210 | A1 * | 8/2016 | Sasaki | G01L 27/007 |
| 2016/0363077 | A1 * | 12/2016 | Suzuki | F02D 35/028 |
| 2019/0085764 | A1 * | 3/2019 | Marroquin | F02M 26/47 |
| 2020/0103303 | A1 * | 4/2020 | Joshi | F02D 35/023 |

* cited by examiner

ABNORMALITY DIAGNOSIS DEVICE FOR IN-CYLINDER PRESSURE SENSOR

TECHNICAL FIELD

The technology disclosed herein relates to an abnormality diagnosis device for an in-cylinder pressure sensor.

BACKGROUND OF THE DISCLOSURE

JP2010-144670A discloses an abnormality diagnosis device for an in-cylinder pressure sensor which detects an output signal of an in-cylinder pressure sensor and diagnoses that the in-cylinder pressure sensor is abnormal when its gain drops excessively.

While this disclosed technology aims to reduce abnormal combustion (pre-ignition), WO2013/132613A1 discloses a technology by which adhered matter (a deposit) accumulated inside a combustion chamber is removed.

In WO2013/132613A1, an ignition timing is advanced to forcibly cause knocking inside the combustion chamber. The deposit is detached by the impact of the knocking, and is thus removed.

When an engine is operated for some time, hard, adhered matter (a deposit) caused by fuel and engine oil accumulates inside a combustion chamber. This deposit negatively affects an in-cylinder pressure sensor exposed to the combustion chamber.

That is, the deposit adheres to a diaphragm of the in-cylinder pressure sensor and the spring constant of the diaphragm increases. The increased spring constant decreases an output value of the in-cylinder pressure sensor.

As a result, even though the output value decreases due to the adhesion of the deposit, the in-cylinder pressure sensor may be misdiagnosed as abnormal or misdiagnosed that a sensitivity of a charge amplifier attached to the in-cylinder pressure sensor has degraded, and unnecessary replacement of the in-cylinder pressure sensor or the charge amplifier may be carried out.

SUMMARY OF THE DISCLOSURE

One purpose of the technology disclosed herein is to improve accuracy of an abnormality diagnosis of an in-cylinder pressure sensor.

According to one aspect of the present disclosure, an abnormality diagnosis device of an in-cylinder pressure sensor attached to an engine of an automobile to detect pressure inside a combustion chamber, is provided.

The device includes a processor configured to execute a sensor diagnosing module to carry out a performance determination in which a performance quality of the in-cylinder pressure sensor is determined based on an electric signal inputted from the in-cylinder pressure sensor. The sensor diagnosing module carries out a first determination in which the performance determination is performed at a given timing, a performance recovery in which a given deposit removal control is executed in which a deposit accumulating inside the combustion chamber is removed when the performance quality of the in-cylinder pressure sensor is determined to fall below a given reference value, and a second determination in which the performance determination is carried out again after the performance recovery. In the second determination, the in-cylinder pressure sensor is diagnosed as abnormal when the performance quality of the in-cylinder pressure sensor is determined to fall below the given reference value.

As described above, when the deposit adheres to a diaphragm of the in-cylinder pressure sensor and the spring constant increases, an output value of the in-cylinder pressure sensor decreases, which may lead to a misdiagnosis in diagnosing the in-cylinder pressure sensor.

In this regard, according to the abnormality diagnosis device, in order to diagnose the abnormality of the in-cylinder pressure sensor, the performance determination is carried out once or twice.

That is, when the performance of the in-cylinder pressure sensor is poor as a result of the first performance determination, the deposit accumulated inside the combustion chamber is removed. Then, the performance determination is carried out again. As a result, if the performance of the in-cylinder pressure sensor is still poor, the in-cylinder pressure sensor is diagnosed as abnormal.

Although the performance determination being carried out once may lead to the misdiagnosis by the performance quality degradation due to the deposit, the performance determination after the deposit removal can avoid such a misdiagnosis. The abnormality of the in-cylinder pressure sensor can suitably be diagnosed. Therefore, the accuracy of the abnormality diagnosis of the in-cylinder pressure sensor improves. Moreover, unnecessary replacement of the in-cylinder pressure sensor or the charge amplifier is avoided.

The efficient diagnosis can be performed since, after the performance determination is carried out once, the deposit removal control and the second performance determination are performed only when the performance of the in-cylinder pressure sensor is poor. The engine can be operated without unnecessary burden.

The engine may include a spark plug configured to ignite a mixture gas inside the combustion chamber. The given deposit removal control may include advancing the ignition timing of the spark plug.

Advancing the ignition timing of the spark plug stimulates the combustion and, if advancing from a suitable ignition timing, it becomes easy to cause knocking. By adjusting the advancing amount, knocking can be caused, and its impact removes the deposit.

The engine may include a spark plug configured to ignite a mixture gas inside the combustion chamber, an intake passage through which intake air is introduced into the combustion chamber, an exhaust passage through which exhaust gas generated in the combustion chamber is discharged, an exhaust gas recirculation EGR passage communicating the intake passage with the exhaust passage and configured to recirculate a portion of exhaust gas to the intake passage, and an EGR valve configured to adjust an amount of exhaust gas flowing inside the EGR passage. The deposit removal control may include igniting the mixture gas by the spark plug to cause combustion in a state where the EGR valve is controlled to reduce the amount of exhaust gas introduced into the combustion chamber.

As EGR gas (exhaust gas) is introduced into the combustion chamber, the air amount decreases accordingly. As a result, combustion becomes slow and it becomes difficult to cause knocking. Therefore, when the amount of EGR gas is large, even if the ignition timing is advanced, there may be a case where knocking does not occur. This tendency becomes stronger in a low load range.

In this regard, as the introduction amount of EGR gas decreases, the air amount increases accordingly. When the air amount increases, it becomes easier to cause knocking. By adjusting the introduction amount of the EGR gas, knocking is stably caused. When knocking occurs, its impact removes the deposit.

The adjustment of the introduction amount of EGR gas can be performed over a wide operating range of the engine. In the low load range, knocking can stably be caused.

The performance determination may be carried out by estimating a pressure inside the combustion chamber at a given timing by way of a calculation, and comparing the estimated pressure with an output value of the in-cylinder pressure sensor at the given timing.

If the pressure inside the combustion chamber is estimated by the calculation, accurate pressure inside the combustion chamber can be estimated even if the in-cylinder pressure sensor is in the abnormal state. Thus, if comparing the estimated pressure with the output value of the in-cylinder pressure sensor detected at the same timing (i.e., an actual measurement value), the performance of the in-cylinder pressure sensor can accurately be diagnosed.

In such a case, the estimated pressure may be corrected according to an engine speed.

When the engine speed changes, a cooling loss accordingly changes, and when the cooling loss changes, the combustion state also changes. If the change affects the estimated value, the determination accuracy may degrade. According to this configuration, since the estimated value is corrected according to the engine speed, the high determination accuracy can be maintained.

The performance determination may be carried out when a supply of fuel to the engine is stopped.

Thus, the performance of the in-cylinder pressure sensor can be diagnosed based on the pressure change inside the combustion chamber which is not influenced by combustion. The accuracy of abnormality diagnosis of the in-cylinder pressure sensor is improved.

When the in-cylinder pressure sensor is diagnosed as abnormal, a notification of the diagnosis result may be carried out.

That is, the user is prompted to replace the in-cylinder pressure sensor or the charge amplifier if it is diagnosed as abnormal. As a result, the in-cylinder pressure sensor or the charge amplifier can be replaced at a suitable timing without any waste.

According to another aspect of the present disclosure, a method of diagnosing abnormality of an in-cylinder pressure sensor attached to an engine of an automobile to detect pressure inside a combustion chamber, is provided. The method includes carrying out a performance determination in which performance quality of the in-cylinder pressure sensor is determined based on an electric signal inputted from the in-cylinder pressure sensor, a first determination in which the performance determination is performed at a given timing, a performance recovery in which a given deposit removal control is executed in which a deposit accumulating inside the combustion chamber is removed when the performance quality of the in-cylinder pressure sensor is determined to fall below a given reference value, and a second determination in which the performance determination is carried out again after the performance recovery. In the second determination, the in-cylinder pressure sensor is diagnosed as abnormal when the performance quality of the in-cylinder pressure sensor is determined to fall below the given reference value.

DETAILED DESCRIPTION OF THE DISCLOSURE

Hereinafter, embodiments of the present disclosure are described in detail with reference to the accompanying drawings. Note that the following description is essentially nothing more than an illustration, and is not to limit the present disclosure, an application thereof, or a usage thereof. In other words, the description of each component is illustrative and is suitably changeable without departing from the scope of the present disclosure.

<Engine>

Figure 1:
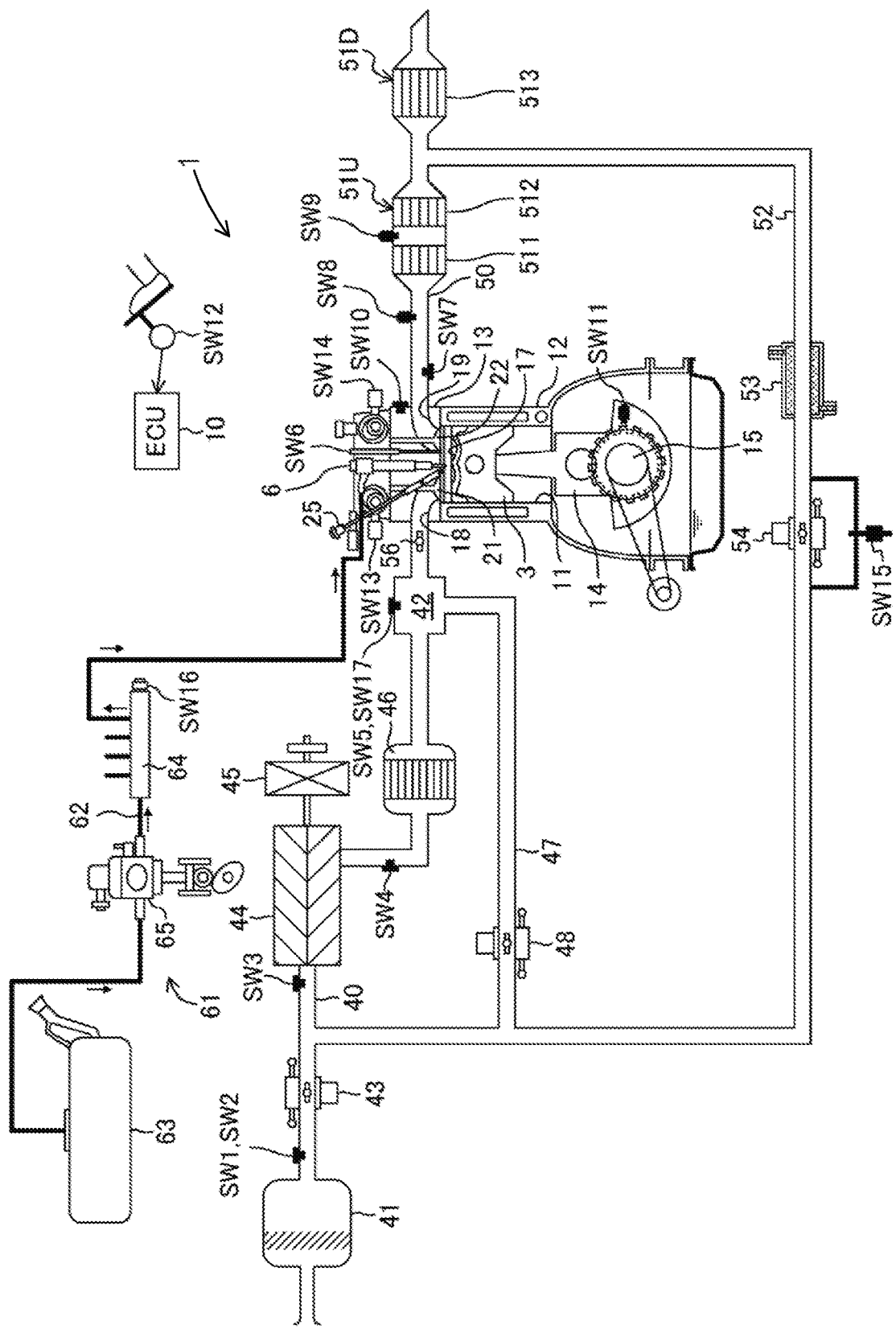
FIG. 1 is a view schematically illustrating a configuration of an engine to which the present disclosure is applied.

FIG. 1 illustrates an engine 1 to which the present disclosure is applied. The engine 1 is a four-stroke reciprocating engine which is operated by a combustion chamber 17 repeating intake stroke, compression stroke, expansion stroke, and exhaust stroke. The engine 1 is mounted on a four-wheel automobile. The automobile travels by the operation of the engine 1.

Although described later in detail, the engine 1 includes an ECU (Engine Control Unit) 10. The engine 1 is controlled by the ECU 10. The ECU 10 constitutes a main part of "an abnormality diagnosis device for an in-cylinder pressure sensor" (may simply be referred to as an "abnormality diagnosis device") of the present disclosure.

Fuel of the engine 1 is gasoline in this embodiment. The fuel may be any kind of fuel as long as it is liquid fuel containing at least gasoline. The gasoline may contain bioethanol, etc.

The engine 1 includes a cylinder block 12 and a cylinder head 13 placed on the cylinder block 12. The cylinder block 12 is formed therein with a plurality of cylinders 11. In FIG. 1, only one cylinder 11 is illustrated. The engine 1 is a multi-cylinder engine.

A piston 3 is reciprocatably inserted into each cylinder 11. The piston 3 is coupled to a crankshaft 15 via a connecting rod 14. The piston 3 defines the combustion chamber 17 together with the cylinder 11 and the cylinder head 13. An upper surface (top surface) of the piston 3 is exposed to the combustion chamber 17.

Note that the "combustion chamber" may have a broad definition. That is, "combustion chamber" may mean any space formed by the piston 3, the cylinder 11 and the cylinder head 13 regardless of the position of the piston 3.

Figure 2:
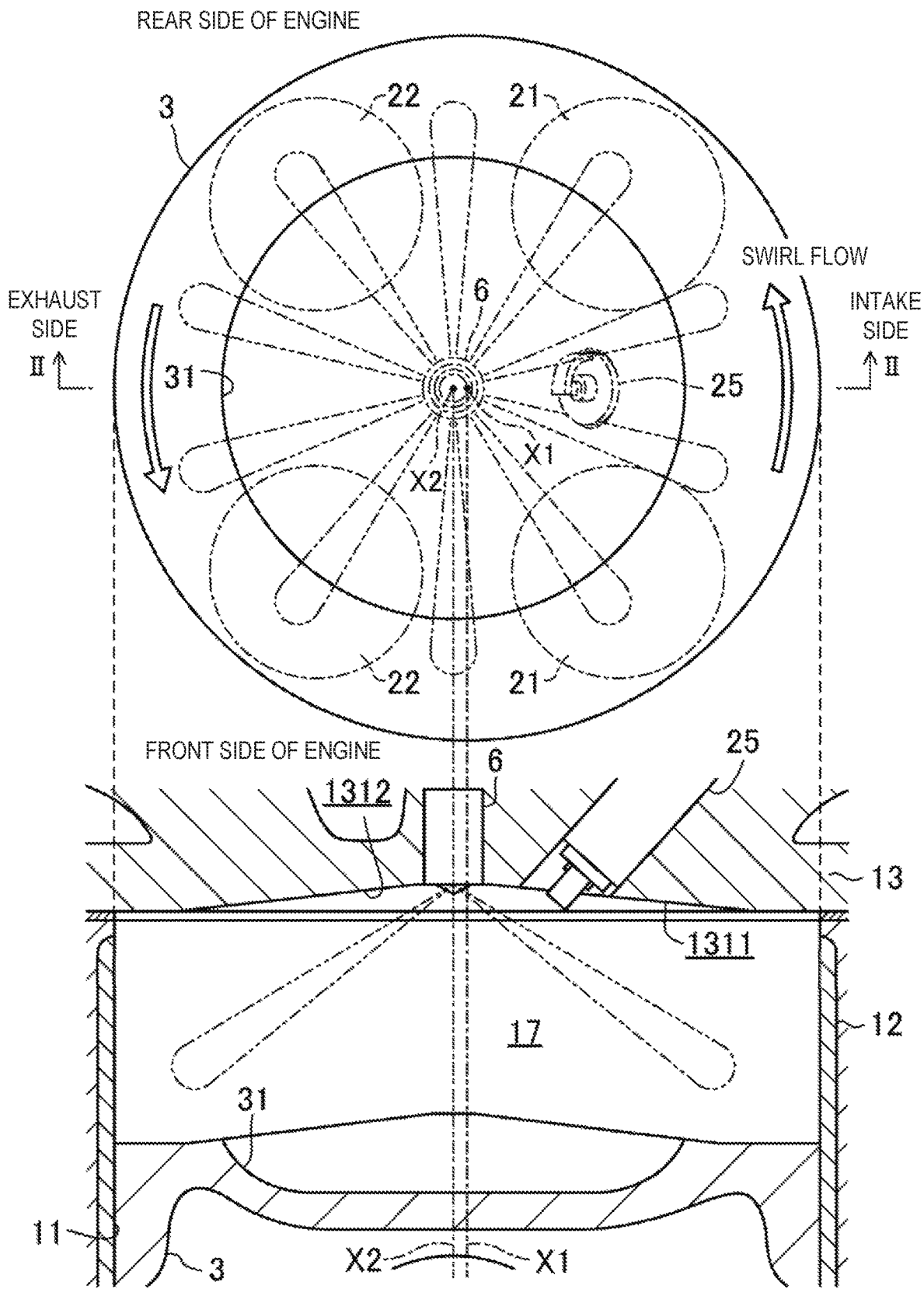
FIG. 2 is a view illustrating a configuration of a combustion chamber, where an upper drawing is a plan view of a combustion chamber, and a lower drawing is a cross-sectional view taken along a line II-II.

As illustrated in the lower drawing of FIG. 2, a lower surface of the cylinder head 13, that is, a ceiling surface of the combustion chamber 17, is formed by an inclined surface 1311 and an inclined surface 1312. The inclined surface 1311 inclines upwardly toward an injection axis X2 (an axis passing through the center of injection of an injector 6 described later) from the intake side. The inclined surface 1312 inclines upwardly toward the injection axis X2 from the exhaust side. The ceiling surface of the combustion chamber 17 has a so-called pent-roof shape.

The upper surface of the piston 3 exposed to the combustion chamber 17 bulges toward the ceiling surface of the combustion chamber 17. The piston 3 is dented in its upper surface to form a cavity 31. The cavity 31 has a shallow plate shape in this embodiment. The center of the cavity 31 is offset from a center axis X1 of the cylinder 11 to the exhaust side.

As described later, within some operating ranges of the engine 1, the engine 1 performs SPCCI (SPark Controlled Compression Ignition) combustion in which SI (Spark Ignition) combustion and the CI (Compression Ignition) combustion are combined.

The SI combustion is combustion accompanying flame propagation which starts by forcibly igniting a mixture gas inside the combustion chamber 17. The CI combustion is combustion which starts by the mixture gas inside the combustion chamber 17 igniting by being compressed.

In the SPCCI combustion, the mixture gas inside the combustion chamber 17 is forcibly ignited to start combustion involving flame propagation. Thus, the heat generation in the SI combustion and a pressure increase due to flame propagation cause the CI combustion of unburned mixture gas inside the combustion chamber 17. In other words, the SPCCI combustion controls the CI combustion by utilizing the heat generated by the SI combustion and the pressure increase. The engine 1 is a compression-ignition engine.

The geometric compression ratio of the engine 1 may be set to between 10:1 and 30:1. For example, the geometric compression ratio of the engine 1 may be set to 16:1 or higher, which is higher than general spark-ignition engines. However, since the engine 1 performs the SPCCI combustion, there is no need for increasing a temperature of the combustion chamber 17 when the piston 3 reaches a top dead center on compression stroke (CTDC), i.e., compression-end temperature. The geometric compression ratio of the engine 1 may be set relatively low. Making the geometric compression ratio low is advantageous in reducing a cooling loss and a mechanical loss.

Further, the geometric compression ratio of the engine 1 may be set to 14:1 to 17:1 in regular specifications (the octane number of the fuel is about 91) and to 15:1 to 18:1 in high-octane specifications (the octane number of the fuel is about 96).

The cylinder head 13 is formed with an intake port 18 for each cylinder 11. Although not illustrated, the intake port 18 includes a first intake port and a second intake port. The intake port 18 communicates with the combustion chamber 17. The intake port 18 is a so-called tumble port. That is, the intake port 18 has a shape to form a tumble flow in the combustion chamber 17.

An intake valve 21 is disposed in the intake port 18. The intake valve 21 opens and closes the intake port 18 to and from the combustion chamber 17. The intake valve 21 is opened and closed by a valve operating mechanism at a given timing. This valve operating mechanism may be a variable valve operating mechanism which makes a valve timing and/or valve lift variable.

Figure 3:
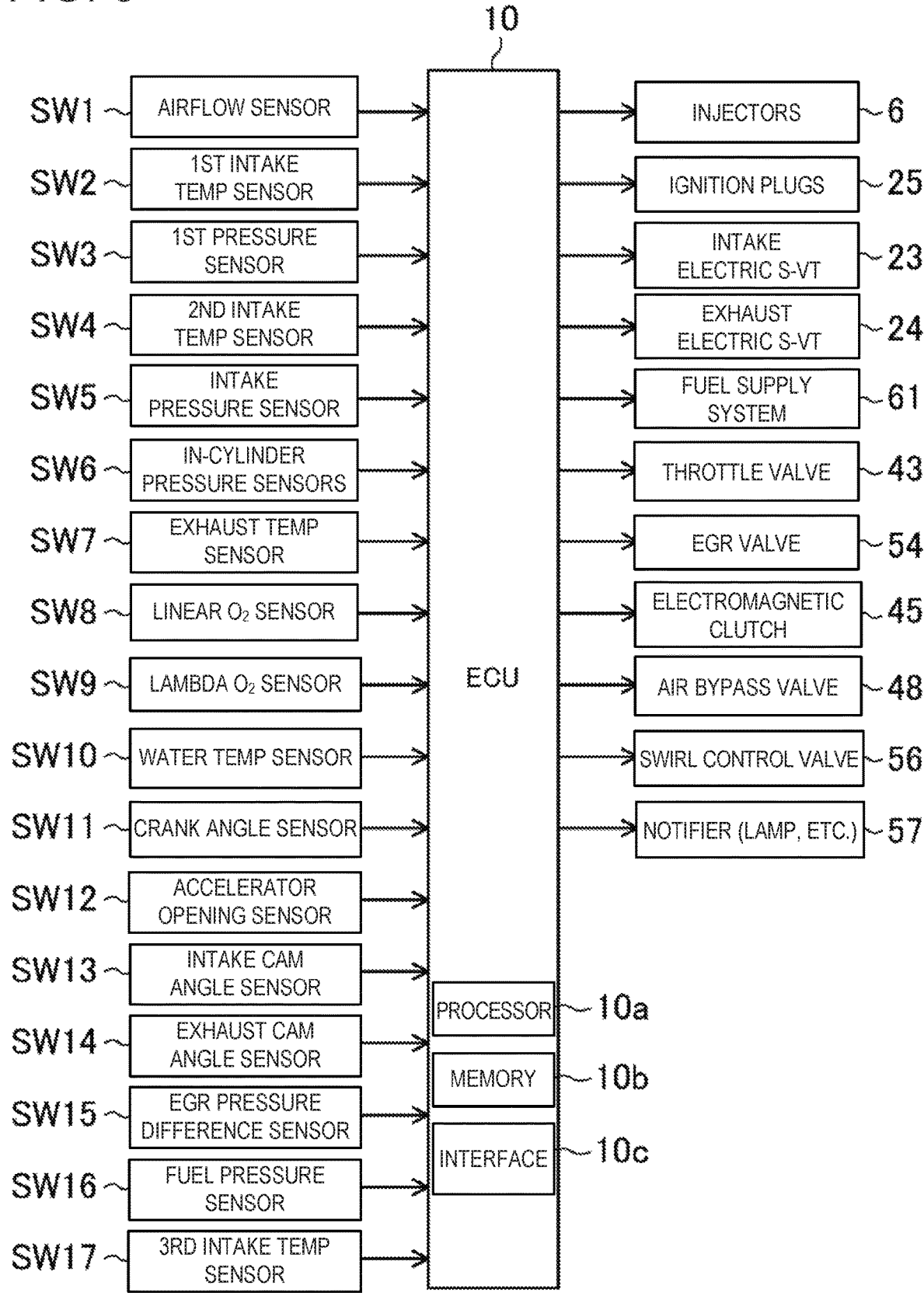
FIG. 3 is a block diagram illustrating a relationship between an ECU and its relevant apparatus.

The engine 1 has, as its variable valve operating mechanism, an intake electric S-VT (Sequential-Valve Timing) 23 (see FIG. 3). The intake electric S-VT 23 is continuously variable of a rotational phase of an intake camshaft within a given angular range. The open and close timings of the intake valve 21 continuously change. Note that the intake valve operating mechanism may have a hydraulic S-VT instead of the electric S-VT.

The cylinder head 13 is also formed with an exhaust port 19 for each cylinder 11. The exhaust port 19 also includes a first exhaust port and a second exhaust port. The exhaust port 19 communicates with the combustion chamber 17.

An exhaust valve 22 is disposed in the exhaust port 19. The exhaust valve 22 opens and closes the exhaust port 19 to and from the combustion chamber 17. The exhaust valve 22 is opened and closed by a valve operating mechanism at a given timing. This valve operating mechanism may be a variable valve operating mechanism which makes a valve timing and/or valve lift variable.

The engine 1 has, as its variable valve operating mechanism, an exhaust electric S-VT 24 (illustrated in FIG. 3). The exhaust electric S-VT 24 is continuously variable of a rotational phase of an exhaust camshaft within a given angular range. The open and close timings of the exhaust valve 22 continuously change. Note that the exhaust valve operating mechanism may have a hydraulic S-VT instead of the electric S-VT.

The intake electric S-VT 23 and the exhaust electric S-VT 24 adjust the length of an overlap period in which the intake valve 21 and the exhaust valve 22 both open. By adjusting the length of the overlap period to be longer, residual gas in the combustion chamber 17 is scavenged. Further, by adjusting the length of the overlap period, internal EGR (Exhaust Gas Recirculation) gas is introduced into the combustion chamber 17. The internal EGR system is constituted by the intake and exhaust electric S-VTs 23 and 24. Note that the internal EGR system is not necessarily constituted by the S-VT.

The injector (fuel injector) 6 is attached to the cylinder head 13 for each cylinder 11. The injector 6 injects the fuel directly into the combustion chamber 17. As illustrated in FIG. 2, the injector 6 is disposed in a valley portion of the pent roof where the inclined surface 1311 and the inclined surface 1312 intersect.

The injection axis X2 of the injector 6 is located on the exhaust side of the center axis X1 of the cylinder 11. The injection axis X2 of the injector 6 is parallel to the center axis X1. The injection axis X2 of the injector 6 coincides with the center of the cavity 31. The injector 6 is oriented toward the cavity 31.

Note that the injection axis X2 of the injector 6 may coincide with the center axis X1 of the cylinder 11. In this case, the injection axis X2 of the injector 6 may coincide with the center of the cavity 31.

Although not illustrated in detail, the injector 6 has a plurality of nozzle ports (10 ports in the engine 1). The nozzle ports are arranged at an even angular interval in the circumferential direction of the injector 6. Therefore, as indicated by two-dotted chain lines in FIG. 2, the injector 6 injects the fuel so that the fuel spray radially spreads from the radial center of the combustion chamber 17.

A fuel supply system 61 is connected to the injector 6. The fuel supply system 61 includes a fuel tank 63 and a fuel supply path 62 connecting the fuel tank 63 with the injector 6. The fuel tank 63 stores the fuel. A fuel pump 65 and a common rail 64 are provided in the fuel supply path 62.

The fuel pump 65 pumps the fuel to the common rail 64. For example, the fuel pump 65 is a plunger pump which is driven by the crankshaft 15. The common rail 64 stores the fuel pumped from the fuel pump 65 at high fuel pressure. When the injector 6 opens, the fuel stored in the common rail 64 is injected into the combustion chamber 17 from the injector 6.

The fuel supply system 61 is suppliable of the fuel at high pressure of 30 MPa or higher to the injector 6. The pressure of the fuel supplied to the injector 6 may be changed according to an operating state of the engine 1.

(Spark Plug 25)

As illustrated in FIGS. 1 and 2, a spark plug 25 is attached to the cylinder head 13 for each cylinder 11. The spark plug 25 forcibly ignites the mixture gas in the combustion chamber 17. The spark plug 25 is disposed at the intake side of the cylinder 11 with respect to the center axis X1. The spark plug 25 is located between the two intake ports 18.

The spark plug 25 is attached to the cylinder head 13 to extend downwardly, toward the center of the combustion chamber 17 in a tilted posture with respect to up-and-down directions of the cylinder head 13. The electrode of the spark plug 25 is located near the ceiling surface of the combustion chamber 17 to be oriented toward inside the combustion chamber 17. Note that the spark plug 25 may be disposed on the exhaust side of the center axis X1 of the cylinder 11. Moreover, the spark plug 25 may be disposed on the center axis X1 of the cylinder 11.

(Intake Passage 40)

As illustrated in FIG. 1, an intake passage 40 is connected to one side of the engine 1. The intake passage 40 communicates with the intake ports 18 of the cylinders 11. Gas flowing in the intake passage 40 (intake air) is introduced into the combustion chamber 17.

An air cleaner 41 is disposed in an upstream end part of the intake passage 40. The air cleaner 41 filters fresh air. A surge tank 42 is disposed in a downstream end part of the intake passage 40. A part of the intake passage 40 downstream of the surge tank 42 forms independent passages branching for the respective cylinders 11. These passages connect with the intake ports 18 of the cylinders 11.

A throttle valve 43 adjustable of the opening is disposed in the intake passage 40 between the air cleaner 41 and the surge tank 42. The throttle valve 43 adjusts the amount of fresh air into the combustion chamber 17.

A supercharger 44 is disposed in the intake passage 40 downstream of the throttle valve 43. The supercharger 44 boosts the intake air introduced into the combustion chamber 17. The supercharger 44 is a supercharger which is driven by the engine 1, for example, of a roots type, a Lysholm type, a vane type, or a centrifugal type.

The supercharger 44 is connected to the engine 1 via an electromagnetic clutch 45. The electromagnetic clutch 45 controls the transmission of a driving force from the engine 1 to the supercharger 44. The control of the electromagnetic clutch 45 is executed by the ECU 10. ON/OFF of the supercharger 44 is switched by the control of the electromagnetic clutch 45.

An intercooler 46 is disposed in the intake passage 40 downstream of the supercharger 44. The intercooler 46 cools the intake air compressed by the supercharger 44. The intercooler 46 may be, for example, of a hydraulically cooling type.

A bypass passage 47 is connected to the intake passage 40. In the intake passage 40, the bypass passage 47 connects a part upstream of the supercharger 44 to a part downstream of the intercooler 46. The bypass passage 47 bypasses the supercharger 44 and the intercooler 46. An air bypass valve 48 is disposed in the bypass passage 47. The air bypass valve 48 adjusts a flow rate of the intake gas flowing through the bypass passage 47.

When the supercharger 44 is turned off, the air bypass valve 48 is fully opened. The gas flowing through the intake passage 40 bypasses the supercharger 44 and is introduced into the combustion chamber 17 of the engine 1. The engine 1 operates in a non-boosted state, that is, in a naturally aspirated state.

When the supercharger 44 is turned on, the engine 1 operates in a boosted state. While the engine 1 operates in the boosting state, the ECU 10 adjusts the opening of the air bypass valve 48. Thus, the intake gas passed through the supercharger 44 partially flows back upstream of the supercharger 44 through the bypass passage 47.

When the ECU 10 adjusts the opening of the air bypass valve 48, the pressure of the intake air introduced into the combustion chamber 17 changes. In other words, the boosting pressure changes. Note that the term "boosted" may be defined as when the pressure in the surge tank 42 exceeds atmospheric pressure, and the term "non-boosted" may be defined as when the pressure in the surge tank 42 falls below the atmospheric pressure.

As illustrated in the white arrow in FIG. 2, the engine 1 generates a swirl flow inside the combustion chamber 17. As illustrated in FIG. 1, a swirl control valve (SCV) 56 is attached to the intake passage 40. Although not illustrated in detail, the SCV 56 is disposed in one of the two intake ports 18.

The SCV 56 is an opening controllable valve capable of adjusting an opening of a flow path. A smaller opening increases the swirl flow, and a larger opening weakens the swirl flow. The swirl flow is not generated at a full opening.

(Exhaust Passage 50)

An exhaust passage 50 is connected to another side of the engine 1 (opposite from the intake passage 40). The exhaust passage 50 communicates with the exhaust ports 19 of the cylinders 11. The exhaust passage 50 leads out the exhaust gas generated inside the combustion chamber 17. Although is not illustrated in detail, an upstream part of the exhaust passage 50 is branched for the respective cylinders 11. These independent passages are connected to the exhaust ports 19 of the cylinders 11, respectively.

An exhaust gas purification system having a plurality of catalytic converters 51U and 51D arranged in the flow direction is disposed in the exhaust passage 50. The upstream catalytic converter 51U is disposed in an engine bay (not illustrated) of the automobile and, as illustrated in FIG. 1, has a three-way catalyst 511 and a gasoline particulate filter (GPF) 512.

The downstream catalytic converter 51D is disposed outside the engine bay and has a three-way catalyst 513. Note that the GPF may be omitted, and the catalytic converters 51U and 51D are not limited to have the three-way catalyst. Moreover, the order of arrangements of the three-way catalyst and the GPF may suitably be changed.

(EGR Passage 52 and EGR Valve 54)

An EGR passage 52 is connected between the intake passage 40 and the exhaust passage 50. The EGR passage 52 circulates a part of the exhaust gas to the intake passage 40. Therefore, the intake air may also contain the exhaust gas in addition to the fresh air.

An upstream end of the EGR passage 52 is connected to the exhaust passage 50 between the upstream and downstream catalytic converters 51U and 51D. A downstream end of the EGR passage 52 is connected to the intake passage 40 upstream of the supercharger 44. The exhaust gas flowing through the EGR passage 52 enters the intake passage 40 from the upstream side of the supercharger 44, without passing through the air bypass valve 48 of the bypass passage 47.

A water-cooling type EGR cooler 53 is disposed in the EGR passage 52. The EGR cooler 53 cools the exhaust gas. Moreover, an EGR valve 54 is disposed in the EGR passage 52. The EGR valve 54 adjusts the amount of the exhaust gas flowing through the EGR passage 52. In other words, the EGR valve 54 adjusts an amount of the cooled exhaust gas recirculated into the intake passage 40 (external EGR gas). The temperature of the intake air is adjusted by controlling the amount of the external EGR gas.

(ECU)

The ECU 10 is a controller based on a well-known microcomputer, and as illustrated in FIG. 3, it includes a processor (e.g., a central processing unit (CPU)) 10a which executes a program, memory 10b storing the programs and data, and an interface 10c (e.g., an input/output bus) which transmits and receives electric signals. The memory 10b stores a control logic used for a certain control (described later in detail), a map, etc.

As illustrated in FIGS. 1 and 3, the ECU 10 is connected to various sensors SW1 to SW17. Each of the sensors SW1 to SW17 outputs detected information as electric signals, into the ECU 10 via the interface 10c. The following provides descriptions of these sensors SW1 to SW17.

Airflow sensor SW1: Disposed in the intake passage 40 downstream of the air cleaner 41 and detects the flow rate of the fresh air therein;

First intake temperature sensor SW2: Disposed in the intake passage 40 downstream of the air cleaner 41 and detects the temperature of the fresh air therein;

First pressure sensor SW3: Disposed at a position of the intake passage 40 downstream of the connecting position to the EGR passage 52 and upstream of the supercharger 44, and detects the pressure of the gas flowing into the supercharger 44;

Second intake temperature sensor SW4: Disposed at a position of the intake passage 40 downstream of the supercharger 44 and upstream of the connecting position to the bypass passage 47, and detects the temperature of the gas flowed out of the supercharger 44;

Intake pressure sensor SW5: Attached to the surge tank 42, and detects the pressure of the gas flowing downstream of the supercharger 44;

In-cylinder pressure sensor SW6: Attached to the cylinder head 13 corresponding to each of the cylinder 11, and detects the pressure inside the combustion chamber 17 (in-cylinder pressure);

Exhaust temperature sensor SW7: Disposed in the exhaust passage 50, and detects the temperature of the exhaust gas discharged from the combustion chamber 17;

Linear $O_2$ sensor SW8: Disposed in the exhaust passage 50 upstream of the upstream catalytic converter 51U, and detects an oxygen concentration within the exhaust gas;

Lambda $O_2$ sensor SW9: Disposed in the upstream catalytic converter 51U downstream of the three-way catalyst 511, and detects an oxygen concentration within the exhaust gas;

Water temperature sensor SW10: Attached to the engine 1, and detects a temperature of the cooling water;

Crank angle sensor SW11: Attached to the engine 1, and detects a rotational angle of the crankshaft 15;

Accelerator opening sensor SW12: Attached to an accelerator pedal mechanism, and detects an accelerator opening corresponding to an operated amount of an accelerator pedal;

Intake cam angle sensor SW13: Attached to the engine 1, and detects a rotational angle of the intake camshaft;

Exhaust cam angle sensor SW14: Attached to the engine 1, and detects a rotational angle of the exhaust camshaft;

EGR pressure difference sensor SW15: Disposed in the EGR passage 52, and detects a difference in pressure between positions upstream and downstream of the EGR valve 54;

Fuel pressure sensor SW16: Attached to the common rail 64 of the fuel supply system 61, and detects the pressure of the fuel to be supplied to the injector 6; and Third intake temperature sensor SW17: Attached to the surge tank 42, and detects temperature of the gas within the surge tank 42, i.e., the temperature of the intake air introduced into the combustion chamber 17.

The ECU 10 determines the operating state of the engine 1 based on the electric signals (detection signals) of various detection values inputted from the sensors SW1 to SW17. Then the ECU 10 calculates a target amount and/or a control amount of each device according to the control logic by suitably using the map.

The ECU 10 outputs electric signals corresponding to the calculated control amounts to the injector 6, the spark plug 25, the intake electric S-VT 23, the exhaust electric S-VT 24, the fuel supply system 61, the throttle valve 43, the EGR valve 54, the electromagnetic clutch 45 of the supercharger 44, the air bypass valve 48, and the SCV 56 via the interface 10c. Thus, the ECU 10 comprehensively controls these devices.

(In-cylinder Pressure Sensor SW6)

Figure 4:
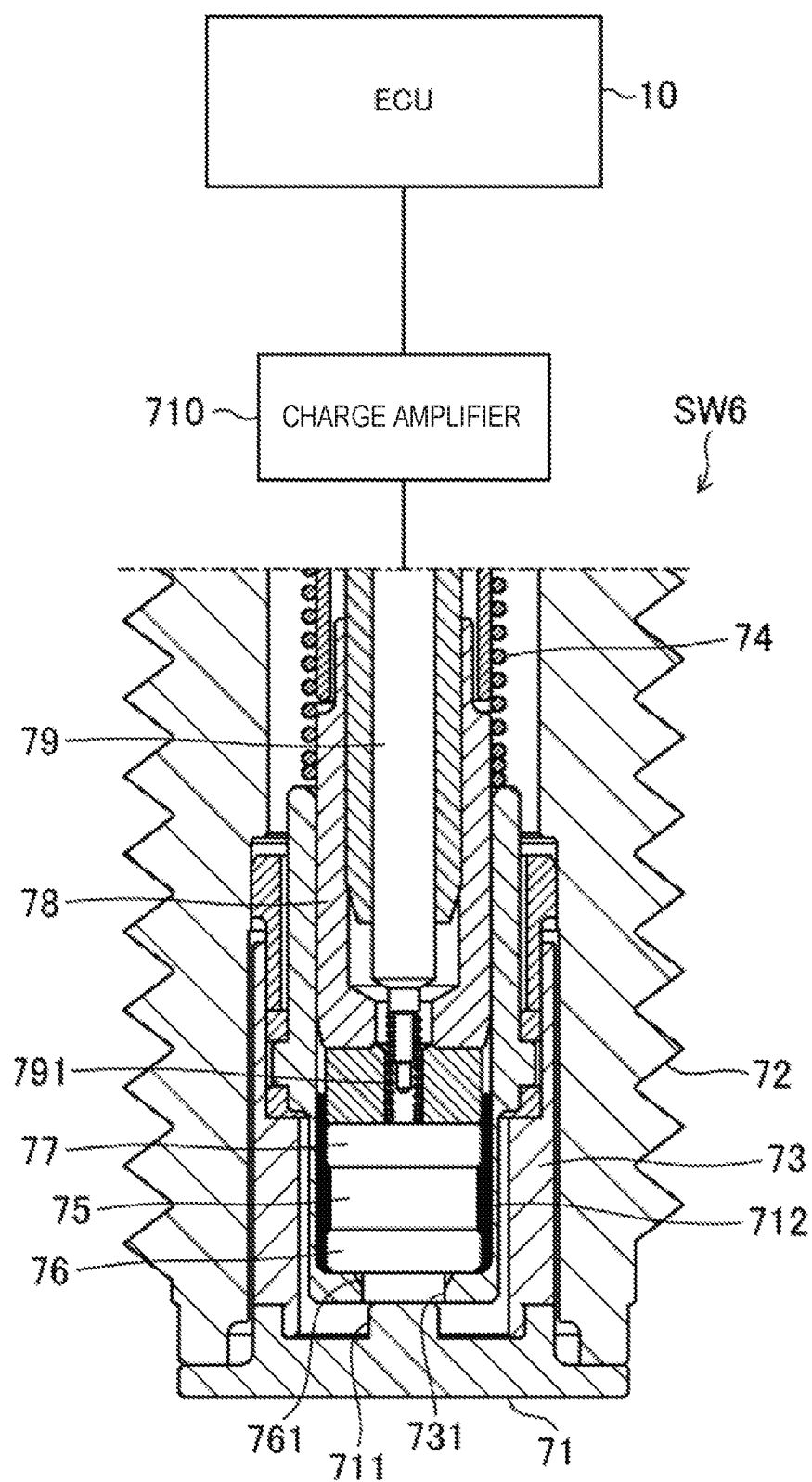
FIG. 4 is a view schematically illustrating a configuration of an in-cylinder pressure sensor.

FIG. 4 illustrates a configuration of the in-cylinder pressure sensor SW6. The in-cylinder pressure sensor SW6 has a diaphragm 71 exposed to the combustion chamber 17. The diaphragm 71 is made of an elastic material. The diaphragm 71 is disposed at a tip end of the in-cylinder pressure sensor SW6 (i.e., a lower side of FIG. 4).

A circumferential edge portion of the diaphragm 71 is supported by a housing. The housing has an outer housing 72 and an inner housing 73. When the pressure inside the combustion chamber 17 increases, an outer surface of the diaphragm 71 is pushed. In this manner, an internal section of the outer housing 72 and the diaphragm 71 (the section not supported by the inner housing 73) is elastically deformed.

Although not illustrated, the outer housing 72 is fixed to the cylinder head 13 of the engine 1. The outer housing 72 has a cylindrical shape opening at its tip end. The diaphragm 71 is fixed, in its circumferential end part, to a tip end surface of the outer housing 72 by welding.

The inner housing 73 is inserted into the outer housing 72. The inner housing 73 is located at a tip end part of the outer housing 72. The inner housing 73 is structured by combining a plurality of components and has a cylindrical shape. The circumferential edge part of the diaphragm 71 is also fixed to the inner housing 73 by welding.

The inner housing 73 is biased toward the tip end of the in-cylinder pressure sensor SW6 by a biasing member 74. The biasing member 74 is disposed inside the outer housing 72, at a base end side of the in-cylinder pressure sensor SW6 (i.e., an upper side of FIG. 4) with respect to the inner housing 73.

A piezo-electric element 75 is disposed inside the inner housing 73. The piezo-electric element 75 changes its shape by the diaphragm 71 elastically deforming. The piezo-electric element 75 outputs a weak electric charge corresponding to the deformed amount.

A pedestal 76 is attached to a tip end part of the piezo-electric element 75. The pedestal 76 has a protrusion 761, at its central part, protruding toward the tip end of the in-cylinder pressure sensor SW6. The protrusion 761 is located inside a through-hole 731 formed in a tip end part of the inner housing 73.

The diaphragm 71 is formed integrally, in its center part of an inner surface, with a central protrusion 711 protruding toward the base end of the in-cylinder pressure sensor SW6. The central protrusion 711 is in contact with the protrusion 761. When the center part of the diaphragm 71 is elastically deformed, the pedestal 76 is pushed toward the base end of the in-cylinder pressure sensor SW6 by the central protrusion 711. Thus, the piezo-electric element 75 changes its shape.

The base end part of the piezo-electric element 75 has an electrode 77 attached thereto. The small electric charge outputted by the piezo-electric element 75 is outputted through the electrode 77.

A base end part of the electrode 77 is supported by an electrode support part 78. The electrode support part 78 is structured by a plurality of members. The electrode support part 78 is welded to the inner housing 73. The electrode support part 78 is disposed therein with a conductive part 79. The conductive part 79 extends toward the base end of the in-cylinder pressure sensor SW6. The base end of the conductive part 79 is connected to a charge amplifier 710 provided to the in-cylinder pressure sensor SW6.

The charge amplifier 710 charges the small electric charge outputted by the piezo-electric element 75 and converts it to voltage. The charge amplifier 710 amplifies the voltage and outputs it to the ECU 10.

A compression spring 791 is disposed between the electrode 77 and the conductive part 79. The compression spring 791 electrically connects the electrode 77 with the conductive part 79.

An annular insulating part 712 (a filled part in black in FIG. 4) intervenes between the inner housing 73 and the integrated pedestal 76, piezo-electric element 75, and electrode 77.

(Concept of SPCCI Combustion)

The engine 1 performs combustion by compression self-ignition in a given operating state in order to improve fuel efficiency and exhaust gas performance. In the combustion caused by self-ignition, the timing of the self-ignition changes greatly if the temperature inside the combustion chamber 17 varies before the compression starts. Therefore, the engine 1 performs the SPCCI combustion in which the SI combustion and the CI combustion are combined.

In the SPCCI combustion, the spark plug 25 forcibly ignites the mixture gas to cause the SI combustion and the CI combustion (partial compression-ignition combustion).

It is possible to reduce the variation of the temperature inside the combustion chamber 17 before the compression starts by adjusting the heat generation amount in the SI combustion. It is possible to self-ignite the mixture gas at a target timing by the ECU 10 adjusting the ignition timing.

Figure 5:
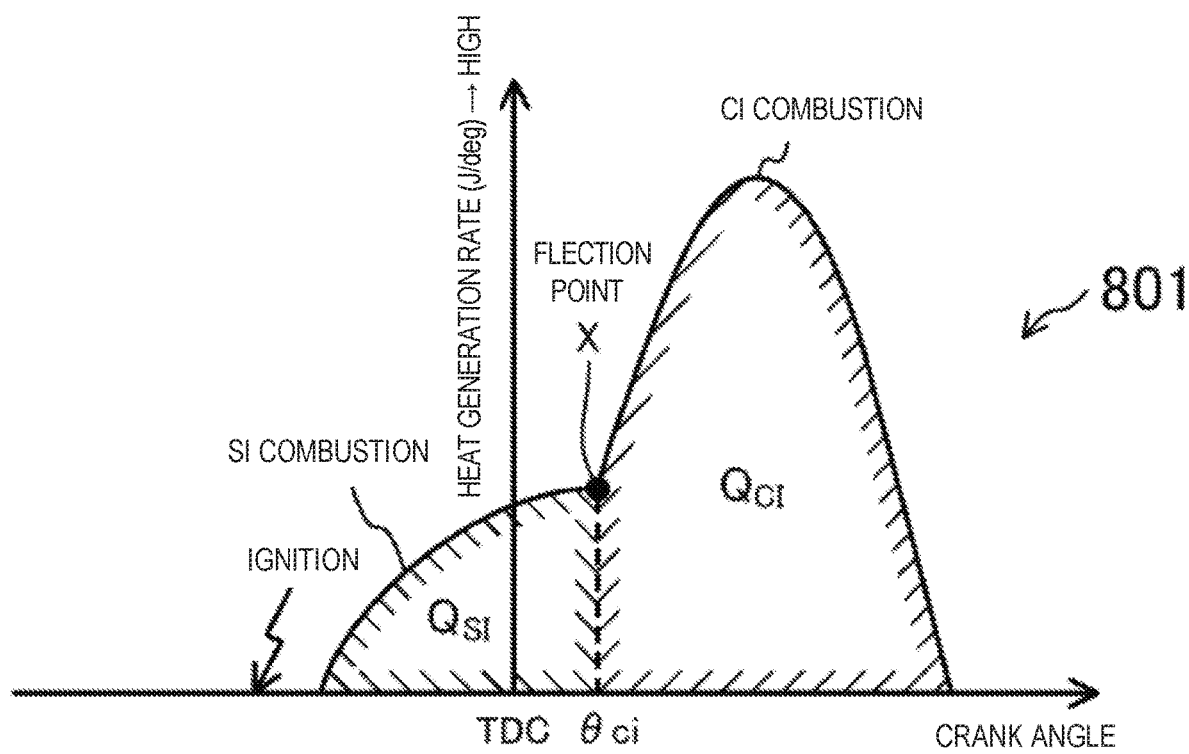
FIG. 5 is a view illustrating a waveform of SPCCI combustion.

In the SPCCI combustion, the heat generation in the SI combustion is slower than the heat generation in the CI combustion. As illustrated in FIG. 5, in a waveform of a heat generation rate $(dQ/d\theta)$ of the SPCCI combustion, SI combustion has a shallower rising slope than that of the CI combustion. Moreover, a pressure fluctuation $(dp/d\theta)$ in the combustion chamber 17 is gentler in the SI combustion than in the CI combustion.

When the unburned mixture gas self-ignites after the SI combustion starts, the slope of the waveform of the heat generation rate may become steeper at the self-ignition timing. The waveform of the heat generation rate may have a flection point X at a timing $\theta ci$ when the CI combustion starts.

After the CI combustion starts, the SI combustion and the CI combustion are performed in parallel. In the CI combustion, since the heat generation is larger than in the SI combustion, the heat generation rate becomes relatively high. However, since the CI combustion is performed after CTDC, the slope of the waveform of the heat generation rate is avoided from becoming excessively steep. Further, the pressure fluctuation $(dp/d\theta)$ in the CI combustion also becomes relatively shallow.

The pressure fluctuation $(dp/d\theta)$ may be used as an index expressing combustion noise. Since the SPCCI combustion reduces the pressure fluctuation $(dp/d\theta)$, excessive combustion noise is avoided. Therefore, combustion noise of the engine 1 is reduced below an allowable value.

The SPCCI combustion ends by finishing the CI combustion. The CI combustion has a shorter combustion period than in the SI combustion. The SPCCI combustion advances the combustion end timing compared to the SI combustion.

The heat generation rate waveform of the SPCCI combustion is formed to have a first heat generation rate portion $Q_{SI}$ formed by the SI combustion and a second heat generation rate portion $Q_{CI}$ formed by the CI combustion, which are next to each other in this order.

Here, an SI ratio is defined as a parameter indicating a property of the SPCCI combustion. The SI ratio is defined as an index relating to a ratio of the heat amount generated by the SI combustion with respect to a total heat amount generated by the SPCCI combustion. The SI ratio is a heat volume ratio resulted from two combustions with different combustion modes.

The ratio of the SI combustion is high when the SI ratio is high, and the ratio of the CI combustion is high when the SI ratio is low. The high ratio of the SI combustion in the SPCCI combustion is advantageous in reducing combustion noise. The high ratio of the CI combustion in the SPCCI combustion is advantageous in improving fuel efficiency of the engine 1.

The SI ratio may be defined as a ratio of the heat amount generated by the SI combustion with respect to the heat amount generated by the CI combustion. In other words, in the SPCCI combustion, when the crank angle at which the CI combustion starts is a CI combustion start timing $\theta ci$, based on a waveform 801 illustrated in FIG. 5 defining an area $Q_{SI}$ of the SI combustion advancing from $\theta ci$ and an area $Q_{CI}$ of the CI combustion including $\theta ci$ and retarding from the $\theta ci$, the SI ratio may be $Q_{SI}/Q_{CI}$.

(Control Logic of Engine)

As described above, the ECU 10 operates the engine 1 according to the control logic stored in the memory 10b.

That is, the ECU 10 determines the operating state of the engine 1 based on the electric signals inputted from the various sensors SW1 to SW17, and sets a target torque. Further, the ECU 10 performs calculations in order to adjust a property inside the combustion chamber 17, the fuel injection amount, the fuel injection timing, and the ignition timing, so that the engine 1 outputs the target torque.

The ECU 10, when performing the SPCCI combustion, controls the SPCCI combustion by using two parameters of the SI ratio and θci. For example, the ECU 10 determines a target SI ratio and a target θci corresponding to the operating state of the engine 1. Further, the ECU 10 adjusts the temperature inside the combustion chamber 17 and the ignition timing to bring the actual SI ratio to the target SI ratio and the actual θci to the target θci.

The ECU 10 sets the target SI ratio low when the engine load is low, and sets the target SI ratio high when the engine load is high. When the engine load is low, the ratio of the CI combustion in the SPCCI combustion is increased to achieve both combustion noise reduction and fuel efficiency improvement. When the engine load is high, the ratio of the SI combustion in the SPCCI combustion is increased to be advantageous in reducing combustion noise.

(Operating Range of Engine 1)

Figure 6:
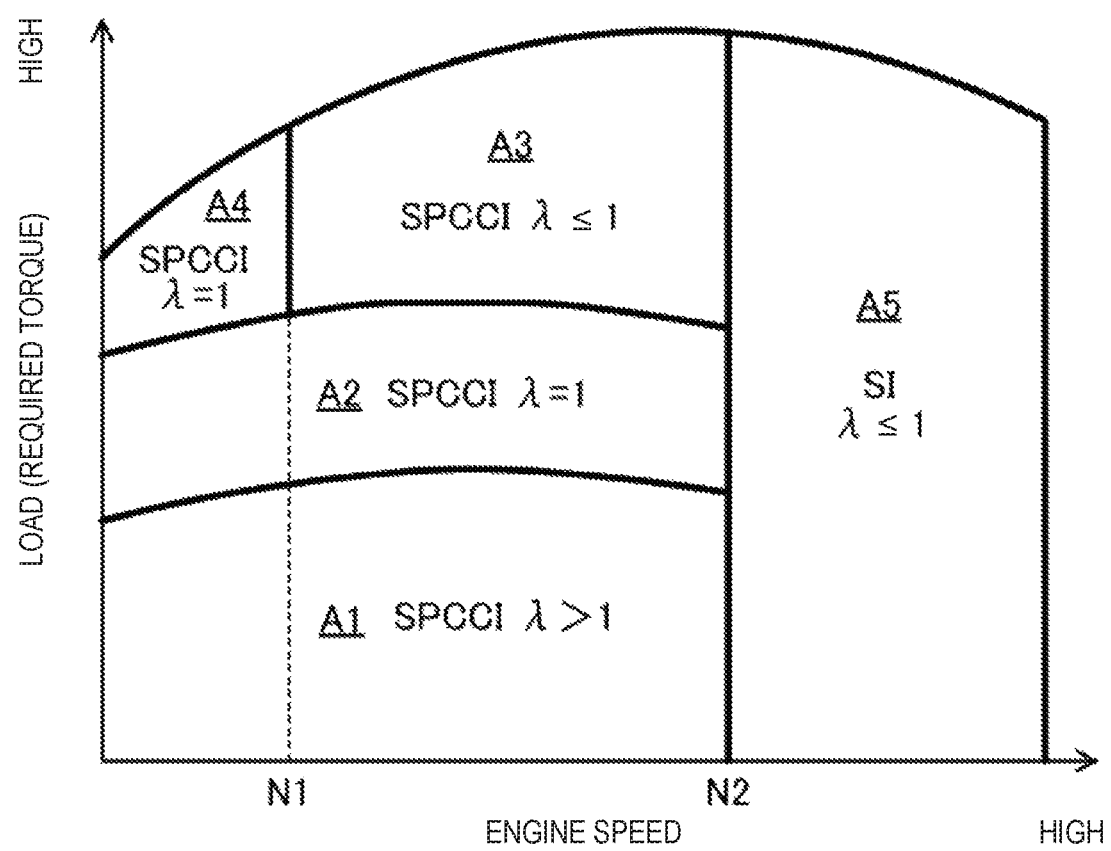
FIG. 6 is one example of a map regarding a combustion control of the engine.

FIG. 6 illustrates a map (in a warmed-up state) according to the combustion control of the engine 1. The map is stored in the memory 10b of the ECU 10 as described above. The map is roughly divided into five ranges based on the engine load and the engine speed.

For example, the five ranges include: a low load range A1, a medium load range A2 (a range in which the engine load is higher than the low load range A1), a high-load medium-speed range A3 (a range in which the engine load is higher than the medium load range A2 and the engine speed is medium), a high-load low-speed range A4 (a range in which the engine load is higher than the medium load range A2 and the engine speed is lower than the high-load medium-speed range A3), and a high speed range A5.

The low speed, the medium speed, and the high speed herein may be defined by substantially evenly dividing, in the engine speed direction, the entire operating range of the engine 1 into three ranges of the low speed, the medium speed and the high speed. In the example of FIG. 6, the engine speed lower than a speed N1 is defined as low, the engine speed higher than a speed N2 is defined as high, and the engine speed between the engine speeds N1 and N2 is defined as medium. For example, the speed N1 may be about 1,200 rpm and the speed N2 may be about 4,000 rpm.

Further, it may be defined such that the low load range includes an idle operation, the high load range includes the full engine load, and the medium load range is between the low load range and the high load range. Moreover, the low load, the medium load, and the high load herein may be defined by substantially evenly dividing, in the engine load direction, the entire operating range of the engine 1 into three ranges of the low load, the medium load and the high load.

The engine 1 performs the SPCCI combustion within the low load range A1, the medium load range A2, the high-load medium-speed range A3, and the high-load low-speed range A4. The engine 1 also performs the SI combustion within the high speed range A5.

An air-fuel ratio of the mixture gas is set lean within the low load range A1 ($\lambda>1$). Within the medium load range A2 and the high-load low-speed range A4, the air-fuel ratio is substantially set to the stoichiometric air-fuel ratio ($\lambda=1$). Within the high-load medium-speed range A3 and the high speed range A5, the air-fuel ratio is substantially set to one of the stoichiometric air-fuel ratio and a rich state ($\lambda \leq 1$). Note that λ corresponds to an excess air ratio ($\lambda=1$: stoichiometric air-fuel ratio).

(Control of EGR Valve 54)

The opening of the EGR valve 54 is controlled such that the SPCCI combustion is suitably performed. That is, the ECU 10 controls the opening of the EGR valve 54 to adjust the amount of the external EGR gas recirculating back to the intake passage 40. As a result, the temperature inside the combustion chamber 17 is adjusted to achieve the target SI ratio and the target θci.

Within the low load side range of the operating range of the engine 1, e.g., during the idling operation in which combustion is weak and the temperature inside the combustion chamber 17 is low, when a large amount of the external EGR gas is introduced, the target SI ratio and the target θci may not be achieved. Therefore, in this case, the introduction amount of the external EGR gas is reduced (reduced to zero depending on the situation).

Further, a large amount of air is required within the operating range in which the required torque is large, e.g., at the full load. Therefore, in this case, the introduction amount of the external EGR gas is reduced (reduced to zero depending on the situation).

In the engine 1, the external EGR gas is introduced within a wide operating range, excluding such limited ranges described above. The automobile frequently uses the low load range A1, the medium load range A2 and their surrounding ranges to travel. Within these operating ranges, a relatively large amount of external EGR gas is introduced.

<Knocking Reduction Control>

The ECU 10 reduces combustion noise (knocking) according to the control logic. That is, since the SPCCI combustion is a combustion mode combining the SI combustion and the CI combustion, knocking caused by the SI combustion (SI knock) and knocking caused by the CI combustion (CI knock) may occur. The ECU 10 prevents these knocking by the manner of executing a control.

The SI knock is a phenomenon in which the unburned gas outside the area where the SI combustion of the mixture gas occurs combusts rapidly by abnormal, local self-ignition (local self-ignition which is clearly different from normal CI combustion). The CI knock is a phenomenon in which main components of the engine 1, e.g., the cylinder block 12, resonate due to a pressure fluctuation by the CI combustion.

The SI knock occurs as loud noise at a frequency of approximately 6.3 kHz due to an organ pipe oscillation generated inside the combustion chamber 17. On the other hand, the CI knock occurs as loud noise at a frequency within a range of approximately 1 to 4 kHz (more specifically, a plurality of frequencies included in this range) by the resonance. Thus, the SI knock and the CI knock occur as noises at different frequencies caused by different reasons.

The ECU 10 controls the SPCCI combustion so that both the SI knock and the CI knock do not occur. For example, the ECU 10 performs the Fourier transform on the detection signal of the in-cylinder pressure sensor SW6 to calculate an SI knock index value related to the SI knock and a CI knock index value related to the CI knock.

The SI knock index value is an in-cylinder pressure spectrum near 6.3 kHz increasing as the SI knock occurs. The CI knock index value is an in-cylinder pressure spectrum near 1 to 4 kHz increasing as the CI knock occurs.

The ECU 10 determines a θci limit such that neither of the SI and CI knock index values exceeds the θci limit, according to a given map. Moreover, the ECU 10 compares θci determined based on the operating state of the engine 1, with the θci limit. In this manner, the ECU 10 determines θci to be the target θci if the θci limit is the same as or advancing than θci. On the other hand, when the θci limit is retarding than θci, the ECU 10 determines the θci limit to be the target θci.

The ECU 10 also executes the above control in the SPCCI combustion control, so as to prevent the SI knock and the CI knock.

<Abnormal Diagnosis of In-cylinder Pressure Sensor SW6>

The engine 1 performs the SPCCI combustion based on the detection value of the in-cylinder pressure sensor SW6. Therefore, when the detection accuracy of the in-cylinder pressure sensor SW6 degrades, the stable operation control of the engine 1 may not be ensured. Thus, the engine 1 includes an abnormality diagnosis device which diagnoses the existence of abnormality of the in-cylinder pressure sensor SW6.

At the time of combustion, although it is a minute amount, the fuel and the engine oil adhere to the upper surface of the piston 3, etc. which define the combustion chamber 17. This adhered matter gradually accumulates over time to generate the deposit. This deposit negatively affects the in-cylinder pressure sensor SW6 exposed to the combustion chamber 17.

In other words, the deposit adheres to the diaphragm 71 of the in-cylinder pressure sensor SW6 and the number of multipliers of a spring of the diaphragm 71 increases. The increased number of the spring multiplier of the diaphragm 71 causes the output value of the in-cylinder pressure sensor to drop. That is, the detection accuracy of the in-cylinder pressure sensor SW6 degrades.

As a result, when the abnormality diagnosis of the in-cylinder pressure sensor SW6 is performed, even though the output value drops due to the adhesion of the deposit, the in-cylinder pressure sensor SW6 may be misdiagnosed to be abnormal or such that sensitivity of the charge amplifier 710 has degraded, and unnecessary replacement of the in-cylinder pressure sensor SW6 or the charge amplifier 710 may be performed.

Therefore, in the engine 1, in order to avoid the unnecessary replacement of the in-cylinder pressure sensor SW6 and the charge amplifier 710, a devisal is provided to improve the accuracy of abnormality diagnosis in the abnormality diagnosis device. Note that since the main body of the abnormality diagnosis device is the ECU 10, the abnormality diagnosis device may be referred to as the ECU 10 for the sake of convenience.

Figure 7:
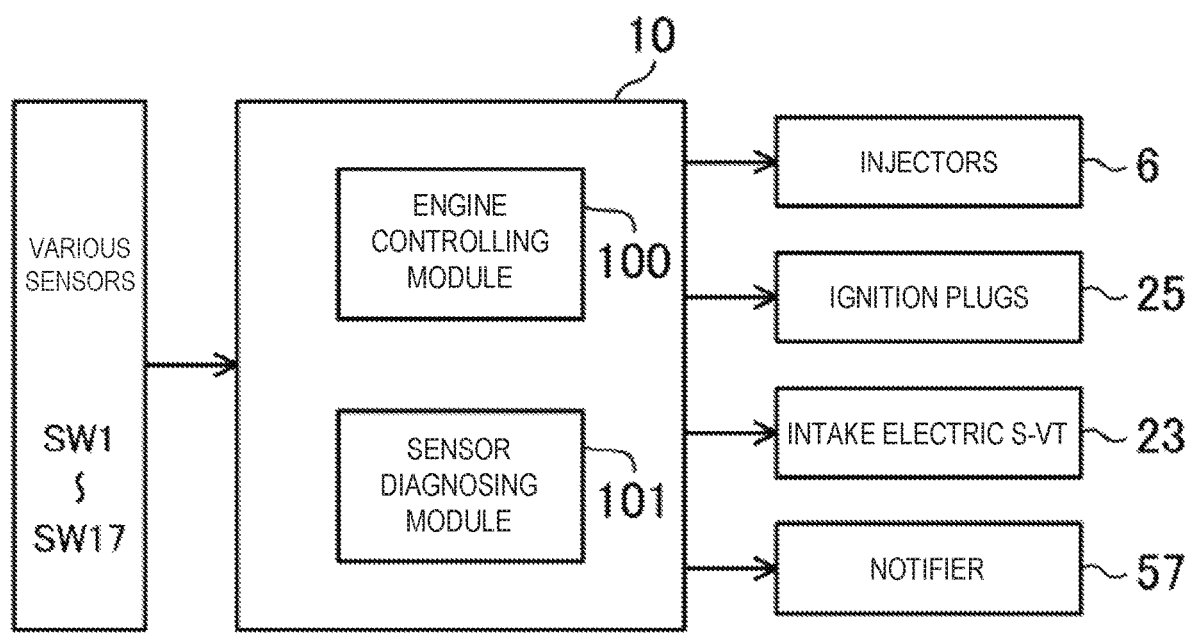
FIG. 7 is a block diagram illustrating a relationship between the ECU and its relevant apparatus in terms of function regarding an abnormality diagnosis of the in-cylinder pressure sensor.

FIG. 7 illustrates a functional configuration of the abnormality diagnosis device. The abnormality diagnosis device includes an engine controlling module 100 and a sensor diagnosing module 101. The processor 10*a* executes these modules to perform their respective functions. These modules are stored in the memory 10*b* as software. The sensor diagnosing module 101 carries out processing (performance determination) which determines the performance of the in-cylinder pressure sensor SW6 based on the detection signal inputted from the in-cylinder pressure sensor SW6.

The engine controlling module 100 carries out a fuel-cut operation of the engine 1 when performing the abnormality diagnosis of the in-cylinder pressure sensor SW6 in cooperation with the sensor diagnosing module 101.

Specifically, the engine controlling module 100 stops the supply of the fuel to the engine 1 through the injector 6, when a slowdown fuel-cut condition is satisfied, during the travel of the automobile. The engine controlling module 100 determines that the slowdown fuel-cut condition is satisfied based on the detection signal of the accelerator opening sensor SW12.

When the fuel supply stops, the engine 1 carries out the fuel-cut operation. The ignition plug 25 does not perform any ignition during the fuel-cut operation. The intake S-VT 23 changes the valve timing of the intake valve 21 to a preset target valve timing. The target valve timing is a valve timing suitable for a resume from the fuel-cut operation. The engine controlling module 100 changes the valve timing of the intake valve 21 to the target valve timing through the intake S-VT 23, after stopping the fuel supply to the engine 1.

The sensor diagnosing module 101 carries out the performance determination while the engine 1 performs the fuel-cut operation. Thus, the sensor diagnosing module 101 can diagnose the performance of the in-cylinder pressure sensor SW6 based on the pressure change inside the combustion chamber 17 which is not influenced by combustion of the mixture gas. Moreover, since the ignition plug 25 does not perform ignition while the engine 1 carries out the fuel-cut operation, there is also an advantage that the detection signal of the in-cylinder pressure sensor SW6 is not influenced by noise of the ignition plug 25.

Here, the sensor diagnosing module 101 does not carry out the performance determination for a given period of time after the fuel supply to the engine 1 is stopped. That is, the performance determination is carried out after the state inside the combustion chamber 17 is stabilized. By doing so, the sensor diagnosing module 101 determines the performance of the in-cylinder pressure sensor SW6 more accurately.

The sensor diagnosing module 101 does not carry out the performance determination until the valve timing of the intake valve 21 reaches the target valve timing. When the close timing of the intake valve 21 changes, the compression start timing of the combustion chamber 17 changes. For this reason, the pressure inside the combustion chamber 17 varies, and the detection signal of the in-cylinder pressure sensor SW6 fluctuates. That is, the performance determination is carried out after the pressure in the combustion chamber 17 is stabilized. By doing so, the sensor diagnosing module 101 determines the performance of the in-cylinder pressure sensor SW6 more accurately.

The sensor diagnosing module 101 carries out the performance determination once or twice in order to diagnose the abnormality of the in-cylinder pressure sensor SW6.

That is, the sensor diagnosing module 101 first carries out the performance determination at a given timing (first determination). If the performance of the in-cylinder pressure sensor SW6 is determined to be appropriate as a result, the sensor diagnosing module 101 determines that the in-cylinder pressure sensor SW6 is normal, and ends the abnormality diagnosis.

On the other hand, if the performance of the in-cylinder pressure sensor SW6 is determined as inappropriate (the sensitivity degrades or is poor), the sensor diagnosing module 101 executes a deposit removal control (performance recovery) described later. That is, the deposit adhering to the diaphragm 71 is removed. Further, the sensor diagnosing module 101 carries out the performance determination again after the performance recovery (second determination).

If the second determination results in determining that the performance of the in-cylinder pressure sensor SW6 is inappropriate, the ECU 10 diagnoses that the in-cylinder pressure sensor SW6 is abnormal. Upon diagnosing that the in-cylinder pressure sensor SW6 is abnormal, the ECU 10 performs processing of notifying the user of the diagnosis result by a notifier 57 (see FIG. 3) (notification).

(Performance Determination)

Figure 8:
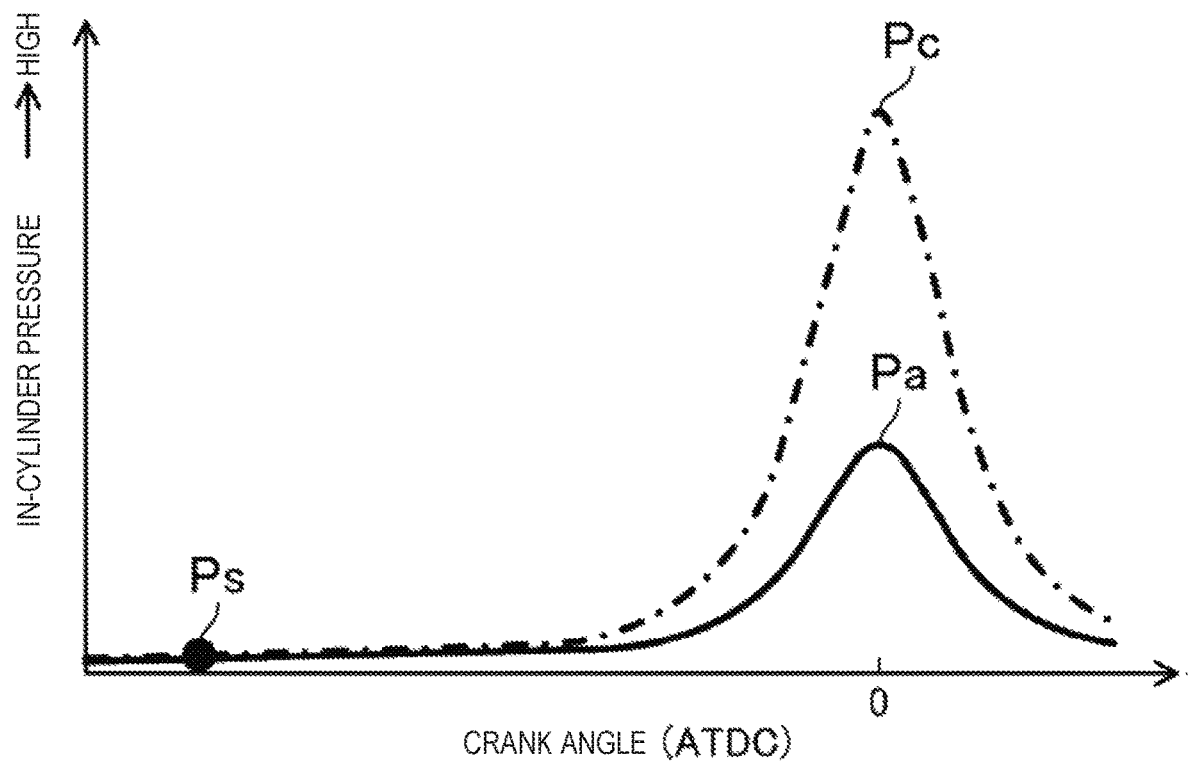
FIG. 8 is a view schematically illustrating a detection signal of the in-cylinder pressure sensor, where the one-dotted chain line indicates a suitable detection signal and the solid line indicates a non-suitable detection signal obtained at a low sensitivity.

FIG. 8 illustrates a detection signal of the in-cylinder pressure sensor SW6. The horizontal axis in FIG. 8 is the crank angle, where "0" is the CTDC. The vertical axis in FIG. 8 is the in-cylinder pressure (pressure inside the combustion chamber 17), in which the one-dotted chain line indicates a suitable detection signal and the solid line indicates a non-suitable detection signal obtained at low sensitivity.

Since the combustion is not performed when the engine 1 is in the fuel-cut operation, the in-cylinder pressure changes as the volume of the combustion chamber 17 changes. The in-cylinder pressure reaches its maximum (peak) near the CTDC.

If the in-cylinder pressure sensor SW6 is appropriate, the peak of the detection signal reaches a given in-cylinder pressure corresponding to the pressure change inside the combustion chamber 17. On the other hand, when the sensitivity of the in-cylinder pressure sensor SW6 degrades, the peak of the detection signal also decreases as the sensitivity degrades.

The value of the in-cylinder pressure at the peak indicated by the in-cylinder pressure sensor SW6 may be predicted from the volume change of the combustion chamber 17 on the compression stroke.

That is, the in-cylinder pressure at the peak may be estimated by using a polytropic change formula based on the valve closing timing of the intake valve 21 (IVC). The in-cylinder pressure at the close timing of the intake valve 21 is acquired from the intake pressure sensor SW5. The in-cylinder pressure at the peak is predicted by a calculation based on the in-cylinder pressure, assuming that the gas inside the combustion chamber 17 undergoes a polytropic change.

If the in-cylinder pressure sensor SW6 is appropriate, that is, if the sensitivity is high, the in-cylinder pressure sensor SW6 outputs a detection signal indicating a value equivalent to the estimated value of the in-cylinder pressure. If the sensitivity degrades, it outputs a detection signal indicating a value lower than the estimated value of the in-cylinder pressure (actual measurement value).

Therefore, the performance of the in-cylinder pressure sensor SW6 is determined by comparing the estimated value at the peak timing with the output value (actual measured value) of the in-cylinder pressure sensor SW6 at this timing. The sensor diagnosing module 101 determines the performance of the in-cylinder pressure sensor SW6 based on a change in the difference (gain) between the estimated value and the actual measured value. Note that the timing to be determined is desirably a peak, but may be other timing.

It is desirable to correct the estimated value according to the engine speed.

That is, a cooling loss varies depending on the engine speed. The cooling loss is small when the engine speed is high, and the cooling loss is large when the engine speed is low. The peak crank angle (determining crank angle) changes depending on the amount of cooling loss. The sensor diagnosing module 101 corrects the determining crank angle according to the engine speed.

Figure 9:
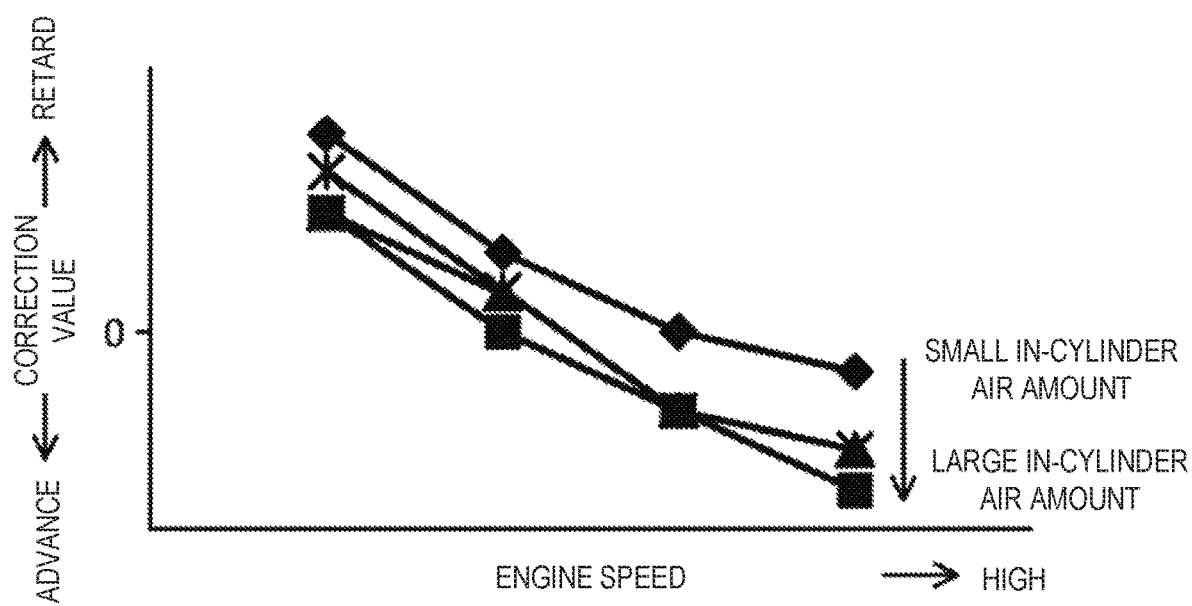
FIG. 9 is a chart illustrating a correction value of a determination crank angle.

FIG. 9 illustrates the correction value of the determining crank angle. The sensor diagnosing module 101 advances the determining crank angle as the engine speed increases. By performing such correction, the in-cylinder pressure at the peak is estimated highly accurately.

(Deposit Removal Control)

As described above, if determined that the performance of the in-cylinder pressure sensor SW6 is inappropriate (the sensitivity degrades) in the first determination, the sensor diagnosing module 101 executes the deposit removal control (performance recovery).

The cause of the sensitivity degradation of the in-cylinder pressure sensor SW6 may be the abnormality of the in-cylinder pressure sensor SW6, such as the sensitivity degradation of one of the in-cylinder pressure sensor SW6 or the charge amplifier 710, otherwise an increase in the number of the spring multiplier of the diaphragm 71 due to the deposit adhesion. Therefore, the sensor diagnosing module 101 carries out the performance recovery in which the deposit is removed, in order to determine whether the sensitivity degradation is caused by the deposit.

Various methods may be considered for the deposit removal control. For example, as the deposit removal control, a control of advancing the ignition timing of the spark plug 25 may be performed. Advancing the ignition timing of the spark plug 25 stimulates the combustion and thus knocking occurs. By causing knocking, its impact detaches the deposit, thus removes it.

Further, a control of reducing the introduction amount of the external EGR gas into the combustion chamber 17 may be executed. For example, in a state where the amount of exhaust gas introduced into the combustion chamber 17 is reduced by controlling the EGR valve 54, the mixture gas is ignited by the spark plug 25 and combusts. Specifically, the EGR rate (the ratio of the amount of external EGR gas to the total amount of the mixture gas inside the combustion chamber 17) is reduced by the correction.

As the amount of external EGR gas introduced into the combustion chamber 17 decreases, the air amount increases accordingly. As described above, in the engine 1, a parameter, such as the SI ratio, is controlled to realize an optimal combustion, including knocking suppression control. By increasing the air amount in the condition for achieving such optimal combustion, knocking is caused. By adjusting the correction amount of the EGR rate, knocking is stably caused.

The EGR rate may be adjusted in a wide operating range of the engine 1. Thus, the stable knocking occurs also within a low load operating range of the engine 1.

A control including advancing the ignition timing of the spark plug 25, and reducing the introduction amount of the external EGR gas into the combustion chamber 17 may be executed. The deposit may be removed by a different method. In short, any method may be applied as long as the deposit is removed.

In the second determination which is carried out again after the performance recovery, if the performance of the in-cylinder pressure sensor SW6 is recovered and determined to be appropriate, the cause of the sensitivity degradation of the in-cylinder pressure sensor SW6 in the first determination is determined to be the deposit. On the other hand, if the in-cylinder pressure sensor SW6 is determined to be inappropriate (sensitivity degrades) in the second determination, the cause thereof is determined to be other than the deposit. Therefore, the sensor diagnosing module 101 diagnoses that the in-cylinder pressure sensor SW6 is abnormal.

(Specific Example of Abnormality Diagnosis of In-cylinder Pressure Sensor SW6)

Figure 10:
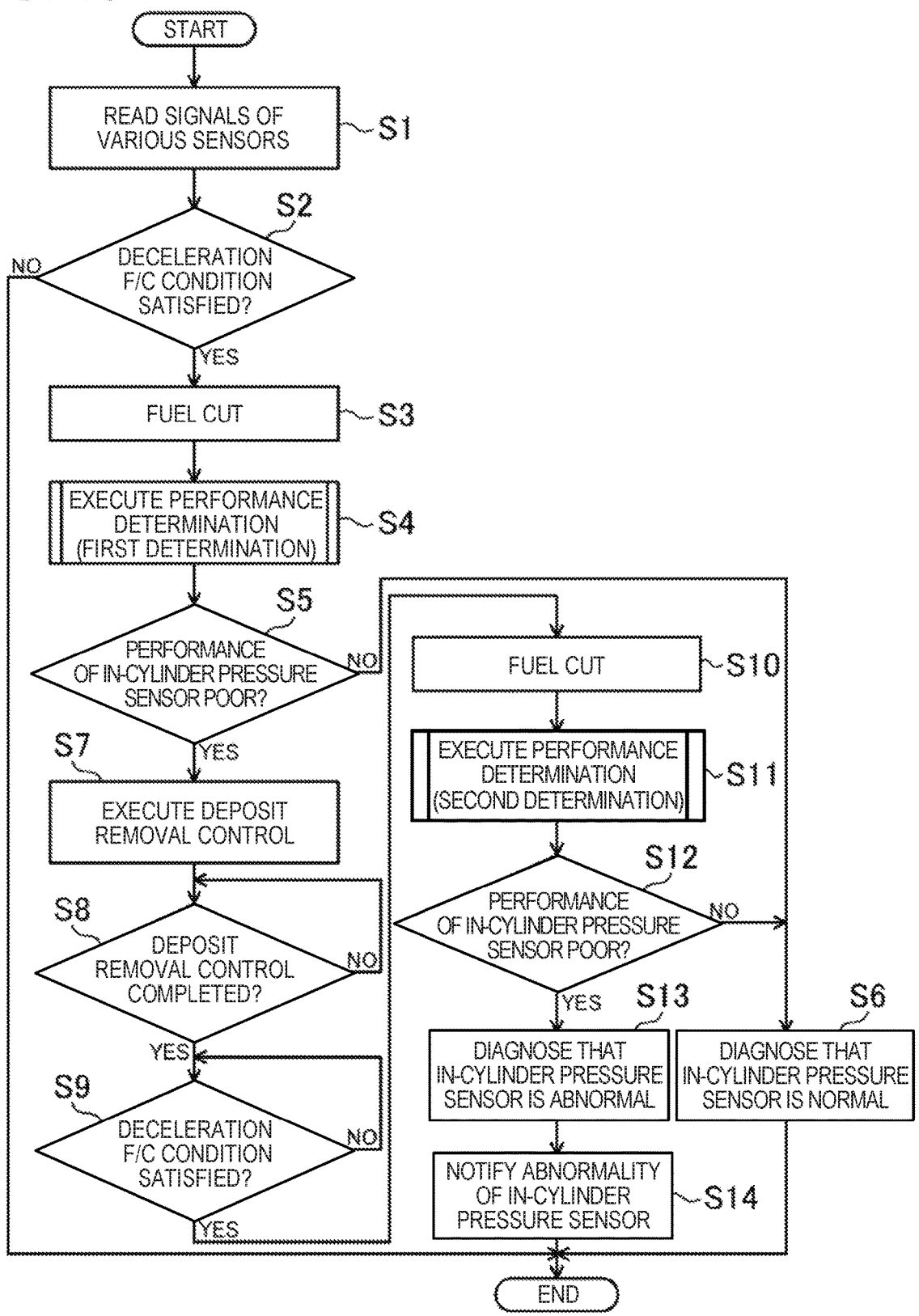
FIG. 10 is a flowchart illustrating one example of processing in the abnormality diagnosis of the in-cylinder pressure sensor.
Figure 11:
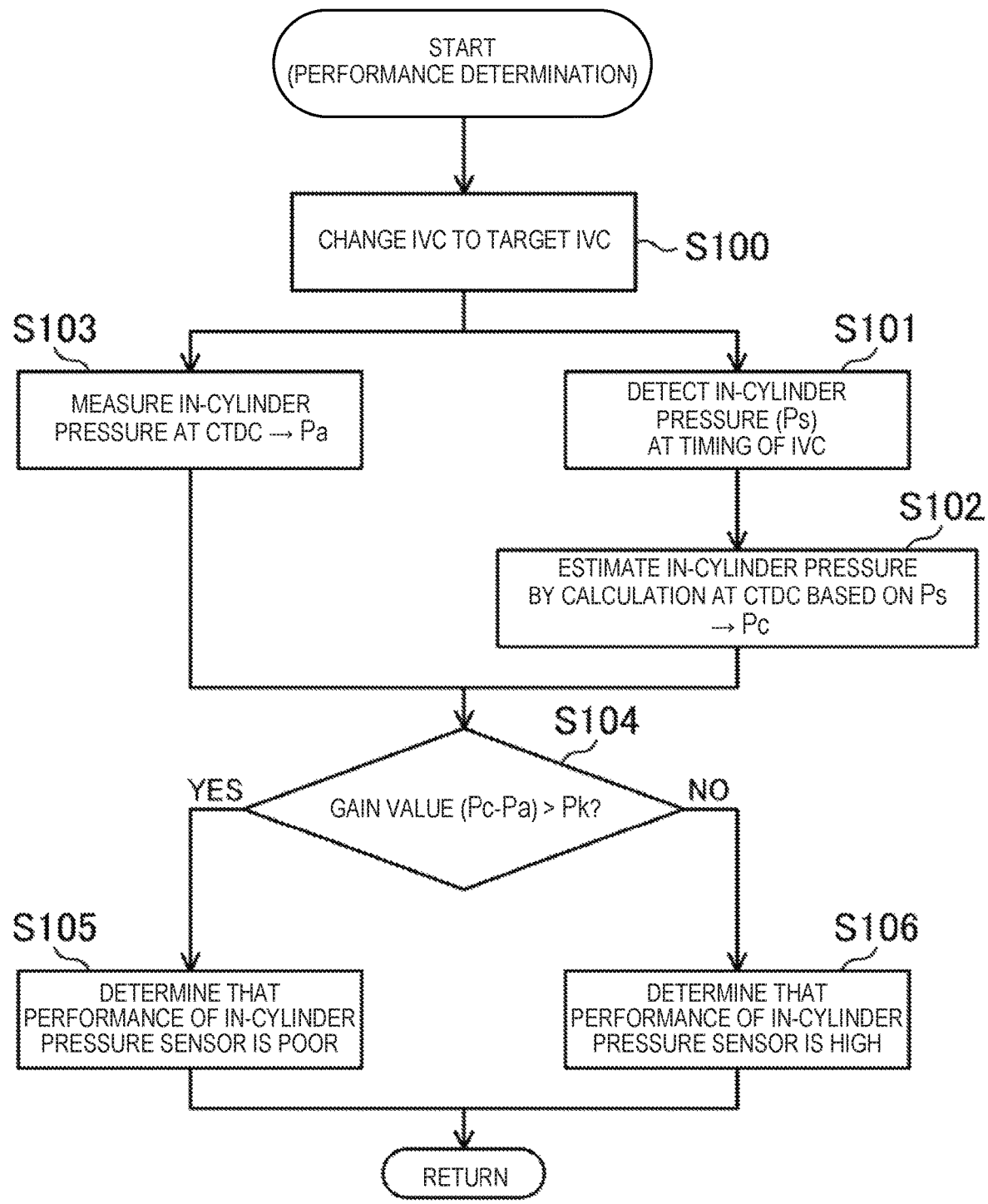
FIG. 11 is a flowchart of a performance determination.

FIGS. 10 and 11 are flowcharts illustrating the flow of processing in the abnormality diagnosis of the in-cylinder pressure sensor SW6. When the automobile is keyed in and turned on, as illustrated in FIG. 10, the ECU 10 (engine controlling module 100) reads the detection signals of the sensors SW1 to SW17 (Step S1). The ECU 10 determines whether the slowdown fuel-cut condition is satisfied (Step S2).

For example, the ECU 10 determines whether the accelerator opening is zero based on the detection signal of the accelerator opening sensor SW12. Further, the ECU 10 determines whether an engine water temperature exceeds a given value and whether the opening of the EGR valve 54 is closed, based on the detection signal of the water temperature sensor SW10.

If the ECU 10 determines that the accelerator opening is zero, the engine water temperature exceeds the given value, and the opening of the EGR valve 54 is closed (the slowdown fuel cut condition is satisfied), the ECU 10 stops the fuel supply to the engine 1, i.e., performs the fuel-cut (Step S3).

While the fuel-cut is thus performed, the performance determination (first determination) is carried out (Step S4). In the performance determination, as illustrated in FIG. 11, in cooperation with the sensor diagnosing module 101, the engine controlling module 100 changes the valve timing (open and close timings) of the intake valve 21 to the target valve timing set during the fuel-cut operation, through the intake S-VT 23 (Step S100).

The sensor diagnosing module 101 detects an in-cylinder pressure Ps at the close timing (IVC) based on the detection signal of the intake pressure sensor SW5 in a given combustion cycle (see Step S101, FIG. 8). Then, the sensor diagnosing module 101 introduces the in-cylinder pressure Ps into a given polytropic change formula to perform a calculation, so as to estimate an in-cylinder pressure Pc at the peak near CTDC (Step S102).

Here, the estimated value Pc is appropriately corrected according to the engine speed (see FIG. 9).

Simultaneously, the sensor diagnosing module 101 measures an in-cylinder pressure Pa at the peak near CTDC by the in-cylinder pressure sensor SW6 (Step S103). Then, the sensor diagnosing module 101 obtains a gain value from the estimated value Pc and the actual measurement value Pa of the in-cylinder pressure and compares it with a given reference value Pk (Step S104).

As a result, when the gain value exceeds the reference value Pk, that is, the performance of the in-cylinder pressure is determined to be poorer than the given reference value, the sensor diagnosing module 101 determines that the performance of the in-cylinder pressure sensor SW6 is "poor (inappropriate)" (Step S105). On the other hand, when the gain value does not exceed the reference value Pk, that is, the performance of the in-cylinder pressure is above the given reference value, the sensor diagnosing module 101 determines that the performance of the in-cylinder pressure sensor SW6 is "high (appropriate)" (Step S106). Then, when the performance determination ends, the sensor diagnosing module 101 returns to the main routine illustrated in FIG. 10.

If the result of the performance determination indicates that the performance of the in-cylinder pressure sensor SW6 is high (NO at Step S5), the sensor diagnosing module 101 diagnoses that the in-cylinder pressure sensor SW6 is normal (Step S6). On the other hand, if the result indicates that the performance of the in-cylinder pressure sensor SW6 is poor (YES at Step S5), the sensor diagnosing module 101 executes the deposit removal control (performance recovery) (Step S7).

One specific example of the deposit removal control includes advancing the ignition timing of the spark plug 25 and reducing the amount of external EGR gas introduced into the combustion chamber 17 as described above. By this control, knocking is caused during combustion for a given period of time. The deposit can be peeled and removed by the impact of this knocking.

When the deposit removal control is completed (YES at Step S8), the ECU 10 again determines whether the slowdown fuel-cut condition is satisfied to execute the performance determination (second determination) (Step S9). If the slowdown fuel-cut condition is satisfied, the fuel-cut is performed again (Step S10).

While the fuel-cut is performed, the performance determination (second determination) is carried out similarly to the first determination (Step S11). If the result of the second determination indicates that the performance of the in-cylinder pressure sensor SW6 is high (NO at Step S12), it is understood that the result of the first determination (determination as poor) is caused by the deposit. Therefore, the ECU 10 diagnoses that the in-cylinder pressure sensor SW6 is normal (Step S6).

On the other hand, if the result indicates that the performance of the in-cylinder pressure sensor SW6 is poor (YES at Step S12), it is understood that the result of the first determination (determination as poor) is caused by the in-cylinder pressure sensor SW6 and not the deposit. Therefore, the ECU 10 diagnoses that the in-cylinder pressure sensor SW6 is abnormal (Step S13).

When the in-cylinder pressure sensor SW6 is diagnosed as abnormal, the ECU 10 executes the notification in which the user is notified of the abnormality of the in-cylinder pressure sensor SW6 through the notifier 57 (Step S14). That is, the user is prompted to replace at least one of the in-cylinder pressure sensor SW6 and the charge amplifier 710.

Thus, according to the engine 1 to which the present disclosure (abnormality diagnosis device) is applied, the accuracy of the abnormality diagnosis of the in-cylinder pressure sensor SW6 is improved. As a result, the unnecessary replacement of the in-cylinder pressure sensor SW6 and the charge amplifier 710 is avoided.

<Application Example of Deposit Removal Control>

Figure 12:
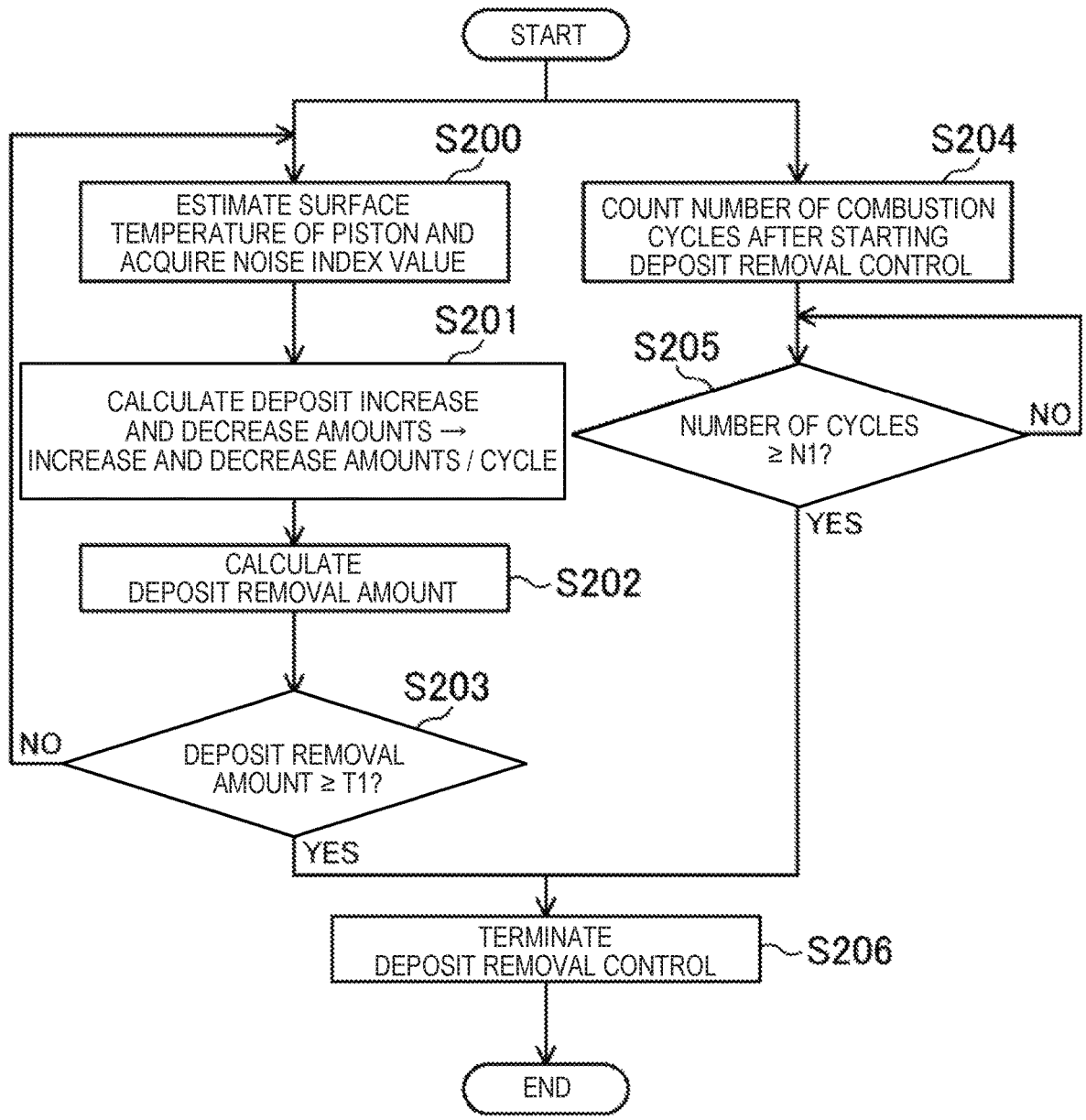
FIG. 12 is a flowchart of a deposit removal control (application example).

FIG. 12 is a flowchart of an application example of the deposit removal control. The deposit removal control of this application example estimates an accumulated deposit amount which changes during the execution of the deposit removal control, and determines the end of the deposit removal control based on the estimated change in the accumulated deposit amount (deposit removal amount estimation control).

Specifically, the ECU 10 (sensor diagnosing module 101) estimates a surface temperature of the piston 3 and acquires a noise index value (SI knock index value) for each combustion cycle during the execution period of deposit removal control (Step S200). The surface temperature of the piston 3 is estimated based on the operating state (required torque, speed) of the engine 1 determined based on the detection inputted from the various sensors SW1 to SW17. As described above, the SI knock index value is calculated based on the detection value of the in-cylinder pressure sensor SW6.

A map (deposit accumulation map) is set in advance in the memory 10b. In the deposit accumulation map, the surface temperature of the piston 3 estimated corresponding to the operating range of the engine 1 is associated with the change in deposit accumulation. The ECU 10 calculates the deposit amount accumulated in the combustion cycle (increase amount) by referring to the operating range of the engine 1 and the deposit accumulation map.

The ECU 10 also acquires the SI knock index value for each combustion cycle during the execution period of deposit removal control. A table (depot removal table) is set in advance in the memory 10*b*. In the deposit removal table, a state of knocking (e.g., the number of times that knocking occurs) and the deposit amount removed by the knocking are associated with each other. The ECU 10 compares the SI knock index value with the deposit removal table to calculate a decreased amount of deposits removed in the combustion cycle (decrease amount).

Then, ECU 10 calculates the change amount of the deposit in the combustion cycle by adding the calculated increase and decrease amounts of the calculated deposit (Step S201). The ECU 10 estimates the total deposit change amount, i.e., the deposit removal amount, by adding the obtained change amount of the deposit for each combustion cycle during the execution period of the deposit removal control (Step S202).

The ECU 10 also executes a control of counting the number of combustion cycles in parallel with the deposit removal amount estimation control (removal period control) (Step S204). The ECU 10 counts the number of combustion cycles after starting the deposit removal control.

The ECU 10 constantly compares the deposit removal amount with a given set value T1 (stored in the memory 10*b*) (Step S203), and terminates the deposit removal control when the deposit removal amount is determined to exceed the given set value T1 (Step S206).

The ECU 10 also constantly compares the number of combustion cycles with a given set value N1 (stored in the memory 10*b*) (Step S205), and terminates the deposit removal control also when the number of combustion cycles is determined to exceed the set value N1 (Step S206).

According to the deposit removal control of this application example, the deposit removal is performed quantitatively, so that the accuracy of abnormality diagnosis of the in-cylinder pressure sensor SW6 is improved.

The set values are set such that the period of deposit removal control is longer in the removal period control than in the deposit removal amount estimation control. In other words, the removal period control is preliminary and is provided to more reliably remove the deposit. Since the removal period control is independent from the deposit removal amount estimation control, the deposit is removed more reliably.

Note that either one of the deposit removal amount estimation control and the removal period control may be executed solely.

Note that the present disclosure is not limited to the above embodiment and may include various other configurations. Although in the above embodiment the engine which performs the SPCCI combustion is described as an example, the engine is not limited to this. Any engine may be applied as long as an in-cylinder pressure sensor is attached thereto.

DESCRIPTION OF REFERENCE CHARACTERS

1 Engine
10 ECU (Abnormality Diagnosis Device)
17 Combustion Chamber
25 Spark Plug
40 Intake Passage
44 Supercharger
50 Exhaust Passage
52 EGR Passage
61 Fuel Supply System
71 Diaphragm
710 Charge Amplifier
100 Engine Controlling Module
101 Sensor Diagnosing Module
SW6 In-cylinder Pressure Sensor

What is claimed is:

1. An abnormality diagnosis device of an in-cylinder pressure sensor attached to an engine of an automobile to detect pressure inside a combustion chamber, comprising:
   a processor configured to execute a sensor diagnosing module to carry out a performance determination in which a performance quality of the in-cylinder pressure sensor is determined based on an electric signal inputted from the in-cylinder pressure sensor, the sensor diagnosing module carrying out:
   a first determination in which the performance determination is performed at a given timing;
   a performance recovery in which a given deposit removal control is executed in which a deposit accumulating inside the combustion chamber is removed when the performance quality of the in-cylinder pressure sensor is determined to fall below a given reference value; and
   a second determination in which the performance determination is carried out again after the performance recovery,
   wherein in the second determination, the in-cylinder pressure sensor is diagnosed as abnormal when the performance quality of the in-cylinder pressure sensor is determined to fall below the given reference value, and
   wherein the performance determination is carried out when a supply of fuel to the engine is stopped.

2. The device of claim 1,
   wherein the engine includes a spark plug configured to ignite a mixture gas inside the combustion chamber, and
   wherein the given deposit removal control includes advancing an ignition timing of the spark plug.

3. The device of claim 1, wherein the engine includes:
   a spark plug configured to ignite a mixture gas inside the combustion chamber;
   an intake passage through which intake air is introduced into the combustion chamber;
   an exhaust passage through which exhaust gas generated in the combustion chamber is discharged;
   an exhaust gas recirculation (EGR) passage communicating the intake passage with the exhaust passage and configured to recirculate a portion of the exhaust gas to the intake passage; and
   an EGR valve configured to adjust an amount of the exhaust gas flowing inside the EGR passage,
   wherein the deposit removal control includes igniting the mixture gas by the spark plug to cause combustion in a state where the EGR valve is controlled to reduce the amount of the exhaust gas introduced into the combustion chamber.

4. The device of claim 1, wherein the performance determination is carried out by estimating a pressure inside the combustion chamber at the given timing by way of a calculation, and comparing the estimated pressure with an output value of the in-cylinder pressure sensor at the given timing.

5. The device of claim 4, wherein the estimated pressure is corrected according to an engine speed.

6. The device of claim 1, wherein when the in-cylinder pressure sensor is diagnosed as abnormal, a notification of the diagnosis result is carried out.

7. A method of diagnosing abnormality of an in-cylinder pressure sensor attached to an engine of an automobile to detect pressure inside a combustion chamber, comprising carrying out:
- a performance determination in which a performance quality of the in-cylinder pressure sensor is determined based on an electric signal inputted from the in-cylinder pressure sensor;
- a first determination in which the performance determination is performed at a given timing;
- a performance recovery in which a given deposit removal control is executed in which a deposit accumulating inside the combustion chamber is removed when the performance quality of the in-cylinder pressure sensor is determined to fall below a given reference value; and
- a second determination in which the performance determination is carried out again after the performance recovery,
- wherein in the second determination, the in-cylinder pressure sensor is diagnosed as abnormal when the performance quality of the in-cylinder pressure sensor is determined to fall below the given reference value, and
- wherein the performance determination is carried out when a supply of fuel to the engine is stopped.

8. An abnormality diagnosis device of an in-cylinder pressure sensor attached to an engine of an automobile to detect pressure inside a combustion chamber, comprising:
- a processor configured to execute a sensor diagnosing module to carry out a performance determination in which a performance quality of the in-cylinder pressure sensor is determined based on an electric signal inputted from the in-cylinder pressure sensor, the sensor diagnosing module carrying out:
- a first determination in which the performance determination is performed at a given timing;
- a performance recovery in which a given deposit removal control is executed in which a deposit accumulating inside the combustion chamber is removed when the performance quality of the in-cylinder pressure sensor is determined to fall below a given reference value; and
- a second determination in which the performance determination is carried out again after the performance recovery,
- wherein in the second determination, the in-cylinder pressure sensor is diagnosed as abnormal when the performance quality of the in-cylinder pressure sensor is determined to fall below the given reference value,
- wherein the engine includes:
  - a spark plug configured to ignite a mixture gas inside the combustion chamber;
  - an intake passage through which intake air is introduced into the combustion chamber;
  - an exhaust passage through which exhaust gas generated in the combustion chamber is discharged;
  - an exhaust gas recirculation (EGR) passage communicating the intake passage with the exhaust passage and configured to recirculate a portion of the exhaust gas to the intake passage; and
  - an EGR valve configured to adjust an amount of the exhaust gas flowing inside the EGR passage, and
- wherein the deposit removal control includes igniting the mixture gas by the spark plug to cause combustion in a state where the EGR valve is controlled to reduce the amount of the exhaust gas introduced into the combustion chamber.

9. An abnormality diagnosis device of an in-cylinder pressure sensor attached to an engine of an automobile to detect pressure inside a combustion chamber, comprising:
- a processor configured to execute a sensor diagnosing module to carry out a performance determination in which a performance quality of the in-cylinder pressure sensor is determined based on an electric signal inputted from the in-cylinder pressure sensor, the sensor diagnosing module carrying out:
- a first determination in which the performance determination is performed at a given timing;
- a performance recovery in which a given deposit removal control is executed in which a deposit accumulating inside the combustion chamber is removed when the performance quality of the in-cylinder pressure sensor is determined to fall below a given reference value; and
- a second determination in which the performance determination is carried out again after the performance recovery,
- wherein in the second determination, the in-cylinder pressure sensor is diagnosed as abnormal when the performance quality of the in-cylinder pressure sensor is determined to fall below the given reference value,
- wherein the performance determination is carried out by estimating a pressure inside the combustion chamber at the given timing by way of a calculation, and comparing the estimated pressure with an output value of the in-cylinder pressure sensor at the given timing, and
- wherein the estimated pressure is corrected according to an engine speed.

10. The device of claim 9,
- wherein the engine includes a spark plug configured to ignite a mixture gas inside the combustion chamber, and
- wherein the given deposit removal control includes advancing an ignition timing of the spark plug.

11. The device of claim 9, wherein the engine includes:
- a spark plug configured to ignite a mixture gas inside the combustion chamber;
- an intake passage through which intake air is introduced into the combustion chamber;
- an exhaust passage through which exhaust gas generated in the combustion chamber is discharged;
- an exhaust gas recirculation (EGR) passage communicating the intake passage with the exhaust passage and configured to recirculate a portion of the exhaust gas to the intake passage; and
- an EGR valve configured to adjust an amount of the exhaust gas flowing inside the EGR passage,
- wherein the deposit removal control includes igniting the mixture gas by the spark plug to cause combustion in a state where the EGR valve is controlled to reduce the amount of the exhaust gas introduced into the combustion chamber.

* * * * *